United States Patent
Yamada et al.

(10) Patent No.: US 8,638,483 B2
(45) Date of Patent: Jan. 28, 2014

(54) IMAGE DISPLAY DEVICE AND HEAD-MOUNTED DISPLAY

(75) Inventors: Keiko Yamada, Sakai (JP); Yoshie Shimizu, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 479 days.

(21) Appl. No.: 13/060,771

(22) PCT Filed: Sep. 12, 2009

(86) PCT No.: PCT/JP2009/065967
§ 371 (c)(1),
(2), (4) Date: Feb. 25, 2011

(87) PCT Pub. No.: WO2010/032700
PCT Pub. Date: Mar. 25, 2010

(65) Prior Publication Data
US 2011/0175799 A1 Jul. 21, 2011

(30) Foreign Application Priority Data
Sep. 17, 2008 (JP) .................................. 2008-237584

(51) Int. Cl.
*G03H 1/00* (2006.01)
*G02B 27/14* (2006.01)

(52) U.S. Cl.
USPC .............................. 359/13; 359/34; 359/633

(58) Field of Classification Search
USPC ................. 359/13, 15, 32, 34, 507, 513–514, 359/630–633, 831, 837, 567, 572; 345/7–9; 356/614–624
See application file for complete search history.

(56) References Cited

U.S. PATENT DOCUMENTS

| | | | |
|---|---|---|---|
| 5,453,877 A | 9/1995 | Gerbe et al. | 359/633 |
| 5,706,108 A | 1/1998 | Ando et al. | 359/16 |
| 6,384,983 B1 | 5/2002 | Yamazaki et al. | 359/631 |
| 2002/0030639 A1* | 3/2002 | Shimizu et al. | 345/32 |
| 2005/0141066 A1* | 6/2005 | Ouchi | 359/15 |
| 2005/0254107 A1 | 11/2005 | Amanai | 359/16 |

FOREIGN PATENT DOCUMENTS

| | | |
|---|---|---|
| JP | 02-297516 A | 12/1990 |
| JP | 09-033853 A | 2/1997 |
| JP | 2001-166252 A | 6/2001 |

(Continued)

*Primary Examiner* — Stephone B Allen
*Assistant Examiner* — Kimberly N Kakalec
(74) *Attorney, Agent, or Firm* — Cozen O'Connor

(57) ABSTRACT

A video image display device (1) is provided with an ocular optical system (12) that guides video image light from a display element (11) to the pupil of an observer through an ocular prism (21) and at the same time guides ambient light to the pupil of the observer through the ocular prism (21). The eyepiece optical system (12) has reflection planes set in the ocular prism (21) that are provided with three or more planes to fold down three or more times an optical path for the video image light from the display element (11), wherein an HOE (23) is formed on at least one plane of the reflection planes. The video image display device (1) satisfies a conditional equation that properly prescribes the relationship between an incident range of the video image light incident on the HOE (23) formed plane in the ocular prism (21) and a display screen size of the display element (11). Thus, the video image display device (1) can widely secure both a video image observation area and a see-through area with a small compact structure.

11 Claims, 12 Drawing Sheets

(56) References Cited

FOREIGN PATENT DOCUMENTS

| JP | 2003-140079 A | 5/2003 |
| JP | 2004-325985 A | 11/2004 |
| JP | 2005-202060 A | 7/2005 |
| JP | 2006-033011 A | 2/2006 |
| JP | 3854763 B2 | 9/2006 |
| WO | WO 2010/032700 A1 | 3/2010 |

* cited by examiner (EMBODIMENT1、EXAMPLE1)

(EMBODIMENT2、EXAMPLE2)

(EMBODIMENT3、EXAMPLE3)

FIG.5 (EMBODIMENT4、EXAMPLE4)

(EMBODIMENT5、EXAMPLE5)

IMAGE DISPLAY DEVICE AND HEAD-MOUNTED DISPLAY

RELATED APPLICATIONS

This application is a U.S. National Stage Application under 35 U.S.C. 371 of International Application No. PCT/JP2009/065967, filed with Japanese Patent Office on Sep. 12, 2009, which claims priority to Japanese Patent Application No. 2008-237584, filed Sep. 17, 2008.

TECHNICAL FIELD

The present invention relates to an image display device that guides image light from a display element and light (external light) of an external image to an observer's pupil; and to a head-mounted display (hereinafter, also called an HMD) that includes the image display device.

BACKGROUND ART

An image display device of a head-mounted type or a face-mounted type, which includes an optical element (e.g., a transparent prism) that has an incident surface, a plurality of reflection surfaces and an output surface; and provides a display image from a display device as a virtual image to an observer, is a so-called HMD and generally known. As such an HMD, recently, an HMD which is used for a display of a so-called wearable computer is studied. Moreover, various HMDs of a see-through type, which allow an observer to observe a virtual image of a display image from a display device and an external image at the same time, are recently proposed.

As HMDs of the see-through type, there are HMDs disclosed in patent documents 1 to 3, for example. All of the HMDs in the patent documents 1 to 3 have a structure which guides image light from a display element (LCD) and external light to an observer's pupil via a prism. Especially, the HMDs in the patent documents 2 and 3 have a structure which reflects the image light two times in the prism and guides the image light to the observer's pupil.

CITATION LIST

Patent Literature

PLT1: JP-A-1990-297516
PLT2: JP-A-2001-166252
PLT3: Japanese Patent No. 3854763

SUMMARY OF INVENTION

Technical Problem

In the meantime, in recent years, a large screen of a display device is rapidly becoming widespread, and it is desired to widely secure a field-angle region (see-through region) for observing an external image in a see-through way and to widely secure a field-angle region (image observation region) for observing a display image. However, the image display device in the patent document 1 is an image display device that is to be mounted on a helmet; and a long light guide distance is necessary to prepare an intermediate image in an optical path, so that size reduction is not achieved. And, the patent document 1 does not describe about any condition for widely securing both of the image observation region and see-through region despite a small size.

Besides, as in the patent documents 2 and 3, by means of the structure which reflects the image light two times in the prism and guides the image light to the observer's pupil, it is impossible to dispose the display element outside and sufficiently away from the image observation region, so that it is impossible to sufficiently secure the see-through region in a peripheral portion of the image observation region. And, to secure a necessary optical path, the prism becomes thick, so that it is impossible to compactly compose not only the image display device that has the prism but also the HMD to have a small size. Besides, the patent documents 2 and 3 also do not disclose any condition for widely securing both of the image observation region and see-through region despite a small size.

The present invention has been made to solve the above problems, and it is an object of the present invention to provide: an image display device that is capable of securing both of a wide image observation region and a wide see-through region with a small-size and compact structure; and a head-mounted display that includes the image display device.

Solution to Problem

An image display device according to the present invention includes: a display element that displays an image; and an eyepiece optical system that guides image light from the display element to an observer's pupil via a prism; and in parallel with which, guides external light to the observer's pupil via the prism. The eyepiece optical system includes, in the prism, three or more reflection surfaces for bending an optical path of the image light from the display element three or more times; a holographic diffraction optical element is formed on at least one surface of the reflection surfaces; the prism includes: a first reflection surface and a second reflection surface that face each other; and a third reflection surface on which the holographic diffraction optical element is formed; the first reflection surface, the second reflection surface and the third reflection surface each reflect the image light at least one time; and the holographic diffraction optical element has optical power. And, the image display device meets the following condition formulas (1) and (2).

$$0.8 < H/y < 1.7 \quad (1)$$

$$1.2 < f/(p + K \cdot \tan(2\theta i)) < 5.5 \quad (2)$$

where H: a length of a straight line that connects both ends of an incident region, for the image light, of the reflection surface where the holographic diffraction optical element is formed in a plane that contains a screen-center principal ray;
y: a length of the display element in a screen short-side direction;
f: a focal length of the eyepiece optical system in the vicinity of the screen-center principal ray in the plane that contains the screen-center principal ray;
p: a length of an optical pupil formed by the eyepiece optical system in a direction that corresponds to the screen short-side direction of the display element;
K: a distance from an output surface, for the image light, of the prism to the optical pupil;
$\theta i$: half of an observation field angle of a display image in the eyepiece optical system in the plane that contains the screen-center principal ray.

In the image display device according to the present invention, the eyepiece optical system is, in the prism, so structured as to bend the optical path of the image light from the display element in a plane that is parallel to a screen short side of the display element and perpendicular to a screen long side of the display element.

It is desirable that the image display device according to the present invention meets the following condition formula (3).

$$1.1 < \theta t/\theta i < 7 \quad (3)$$

where θt: half of an observation field angle of an external image by the external light that travels in the prism in the plane that contains the screen-center principal ray.

It is desirable that the when the prism is defined as a first prism, the image display device according to the present invention includes a second prism which is disposed adjacent or adhered to the first prism and cancels refraction of the external light at the first prism.

In the image display device according to the present invention, it is desirable that the third reflection surface has optical power.

In the image display device according to the present invention, it is desirable that the third reflection surface has a rotationally asymmetrical anamorphic shape.

In the image display device according to the present invention, it is desirable that in the third reflection surface, a focal length in a direction corresponding to the screen long-side direction of the display element is smaller than a focal length in the direction corresponding to the screen short-side direction of the display element.

In the image display device according to the present invention, the third reflection surface may be a cylindrical surface.

In the image display device according to the present invention, it is desirable that the cylindrical surface has the optical power in the direction corresponding to the screen long-side direction of the display device.

It is desirable that the image display device according to the present invention meets the following condition formula (4).

$$0.02 < |L/R| < 0.5 \quad (4)$$

where L: a distance to a point farthest from the optical pupil in the incident region, for the image light from the display element, of the cylindrical surface in the plane that contains the screen-center principal ray.

R: a radius of curvature of the cylindrical surface.

A head-mounted display according to the present invention may be so structured as to include: the above image display device according to the present invention; and a support means that supports the image display device in front of the observer.

Advantageous Effects of Invention

According to the present invention, the eyepiece optical system includes, in the prism, the three or more reflection surfaces for bending the optical path of the image light from the display element three or more times, so that it is possible to thin the thickness of the entire eyepiece optical system; and compactly compose not only the image display device but also the HMD that have a small size. Besides, by meeting the above condition formulas in the present invention, it is possible to curb increase in the thickness of the prism and secure both of a wide image display region and a wide see-through region.

DESCRIPTION OF EMBODIMENTS

Embodiments of the present invention are described based on the drawings as follows.

1. HMD

Figure 1:
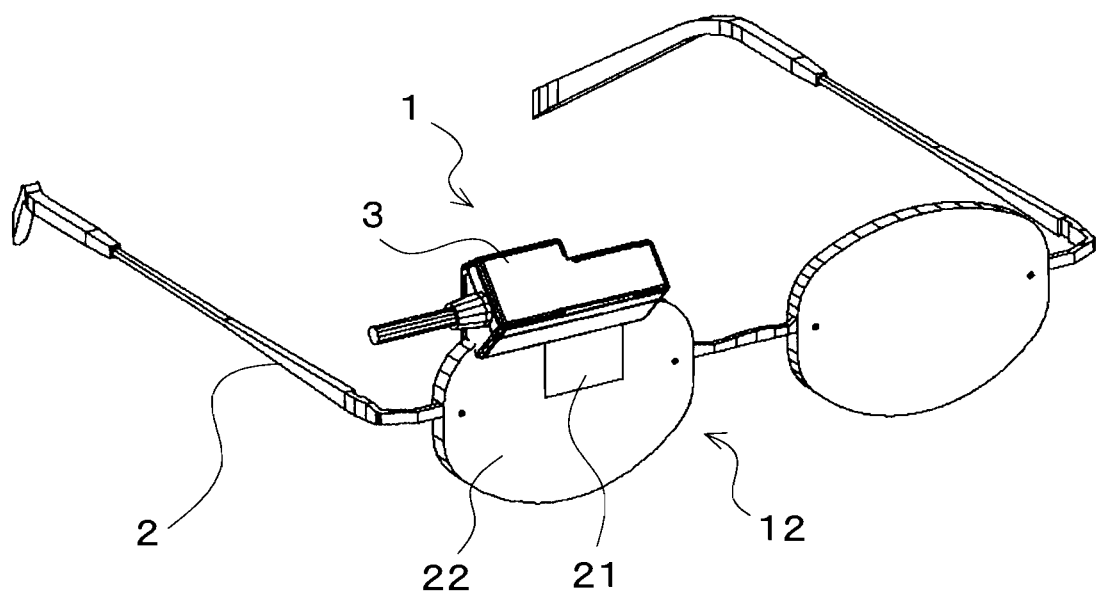
FIG. 1 is a perspective view showing a schematic structure of an HMD according to the present invention.

FIG. 1 is a perspective view showing a schematic structure of an HMD. The HMD is composed of an image display device 1 and a support means 2.

Figure 2:
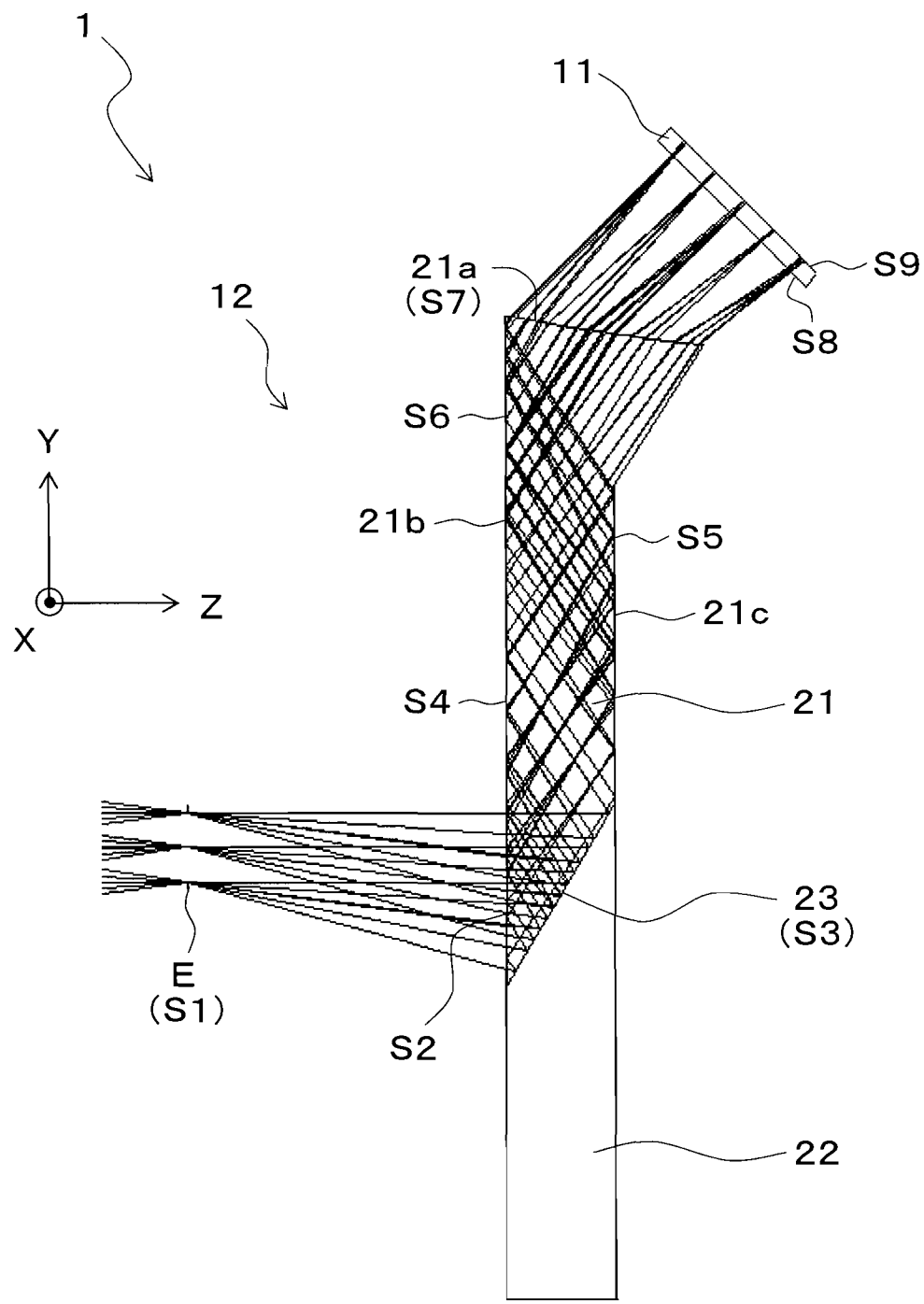
FIG. 2 is a sectional view showing a schematic structure of an image display device according to an embodiment 1 of the present invention.
Figure 3:
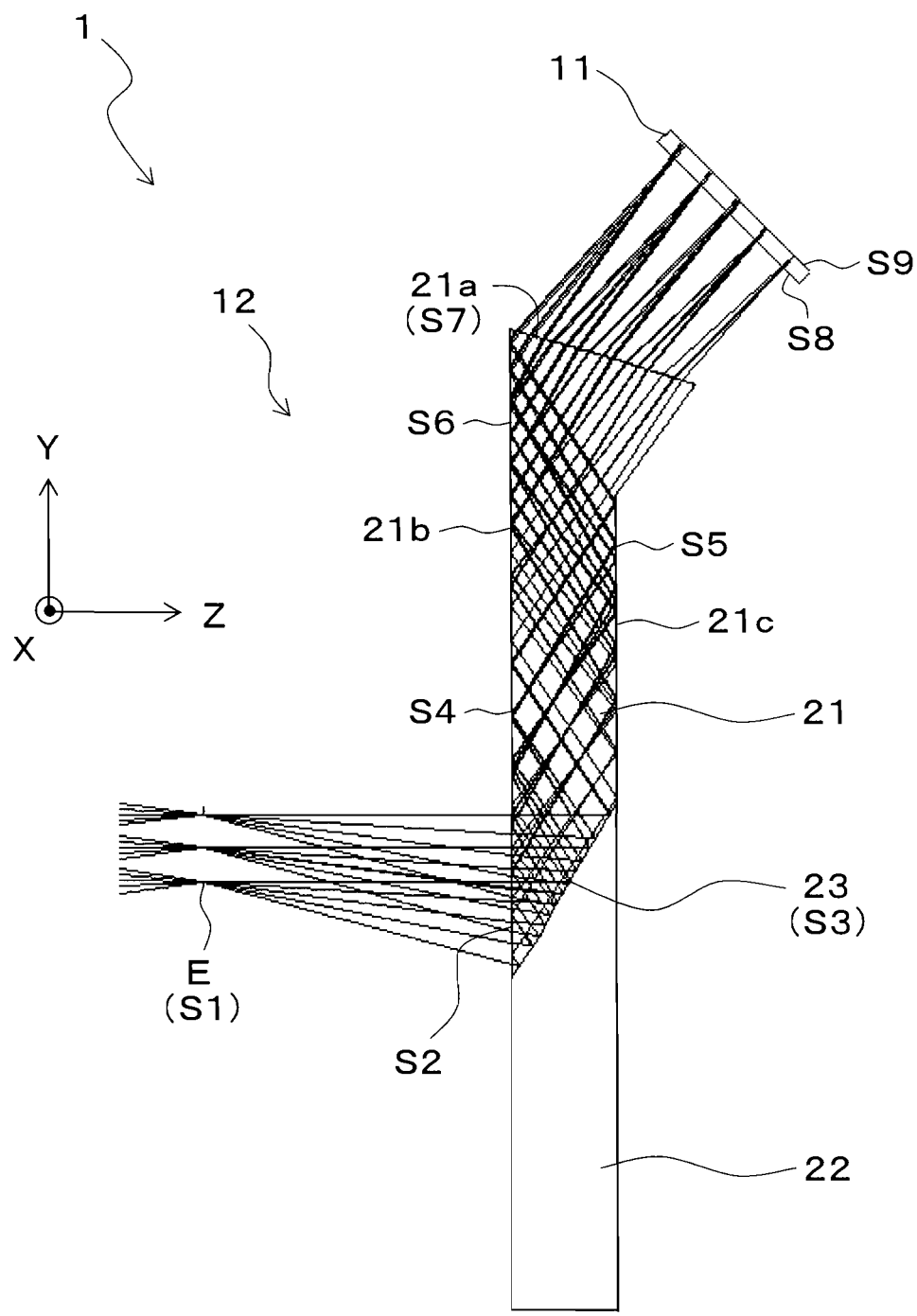
FIG. 3 is a sectional view showing a schematic structure of an image display device according to an embodiment 2 of the present invention.
Figure 4:
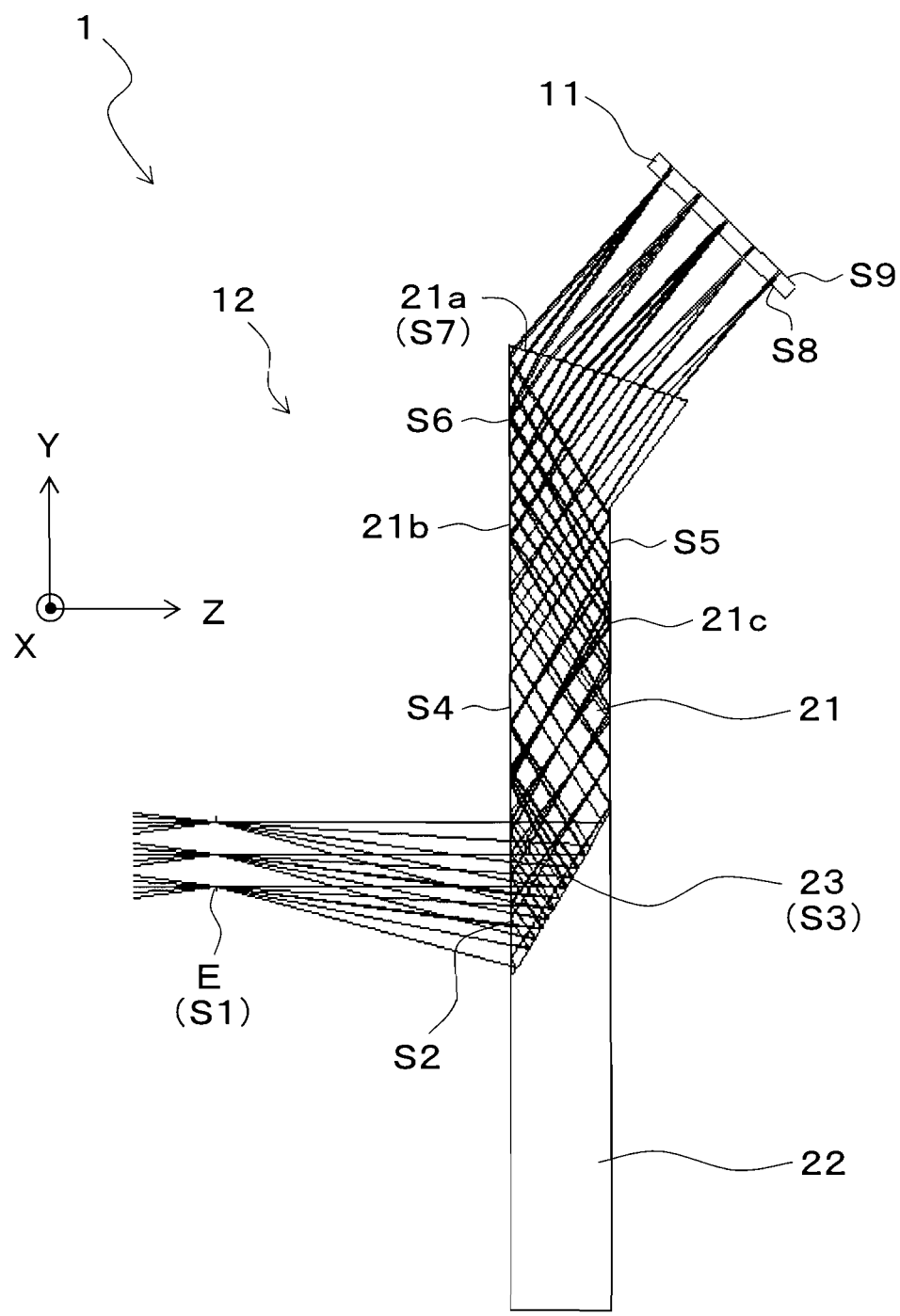
FIG. 4 is a sectional view showing a schematic structure of an image display device according to an embodiment 3 of the present invention.
Figure 5:
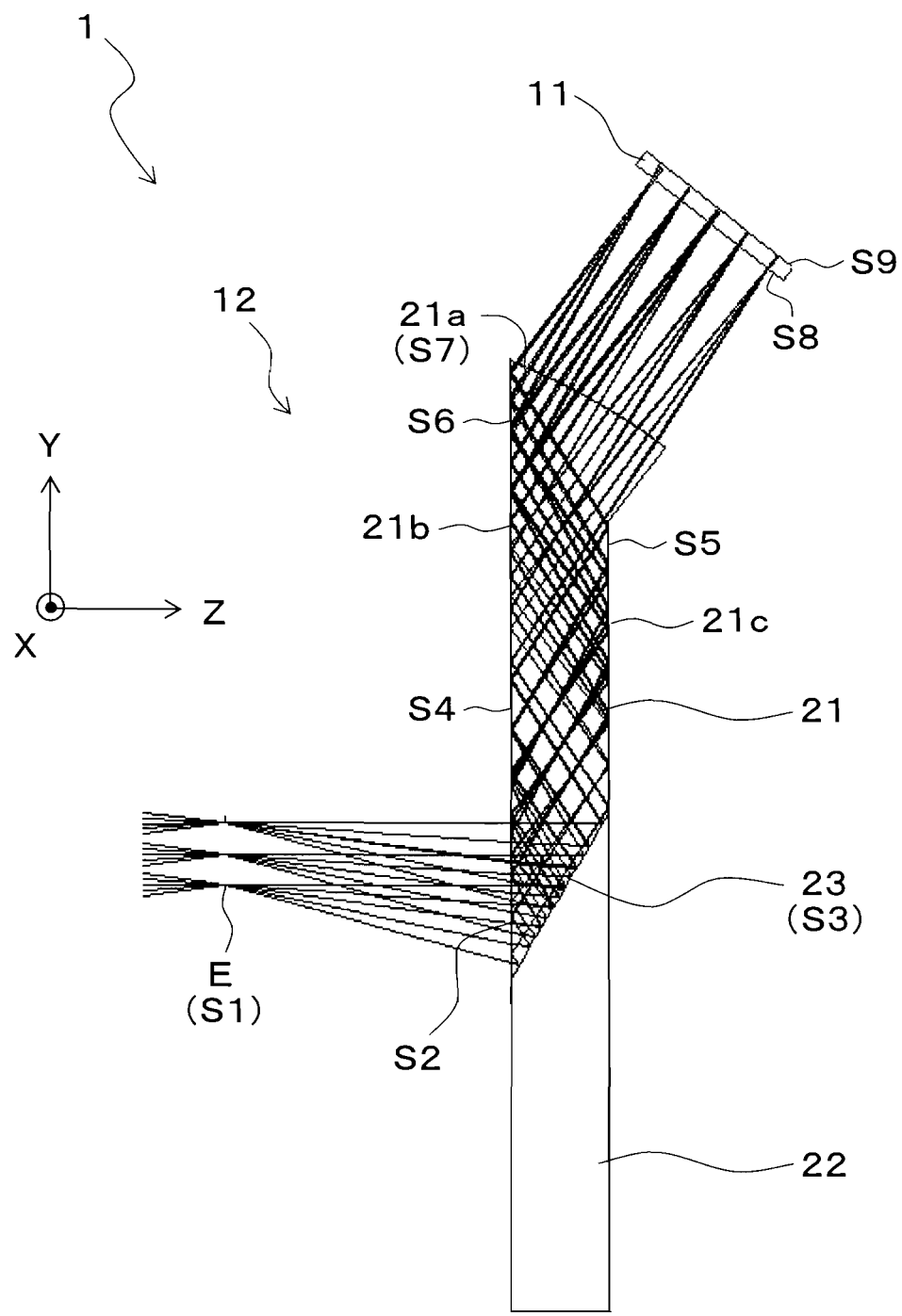
FIG. 5 is a sectional view showing a schematic structure of an image display device according to an embodiment 4 of the present invention.
Figure 6:
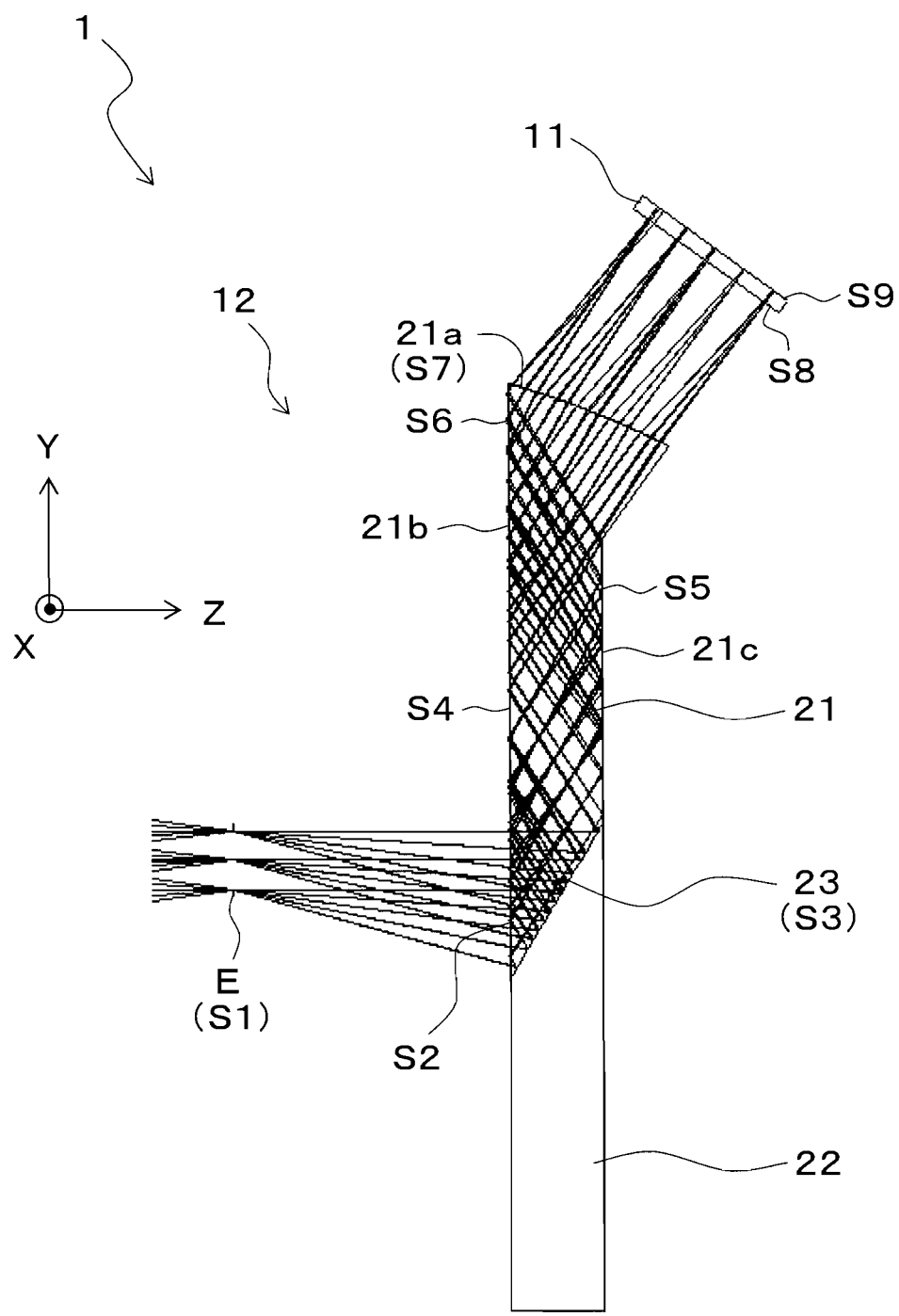
FIG. 6 is a sectional view showing a schematic structure of an image display device according to an embodiment 5 of the present invention.
Figure 7:
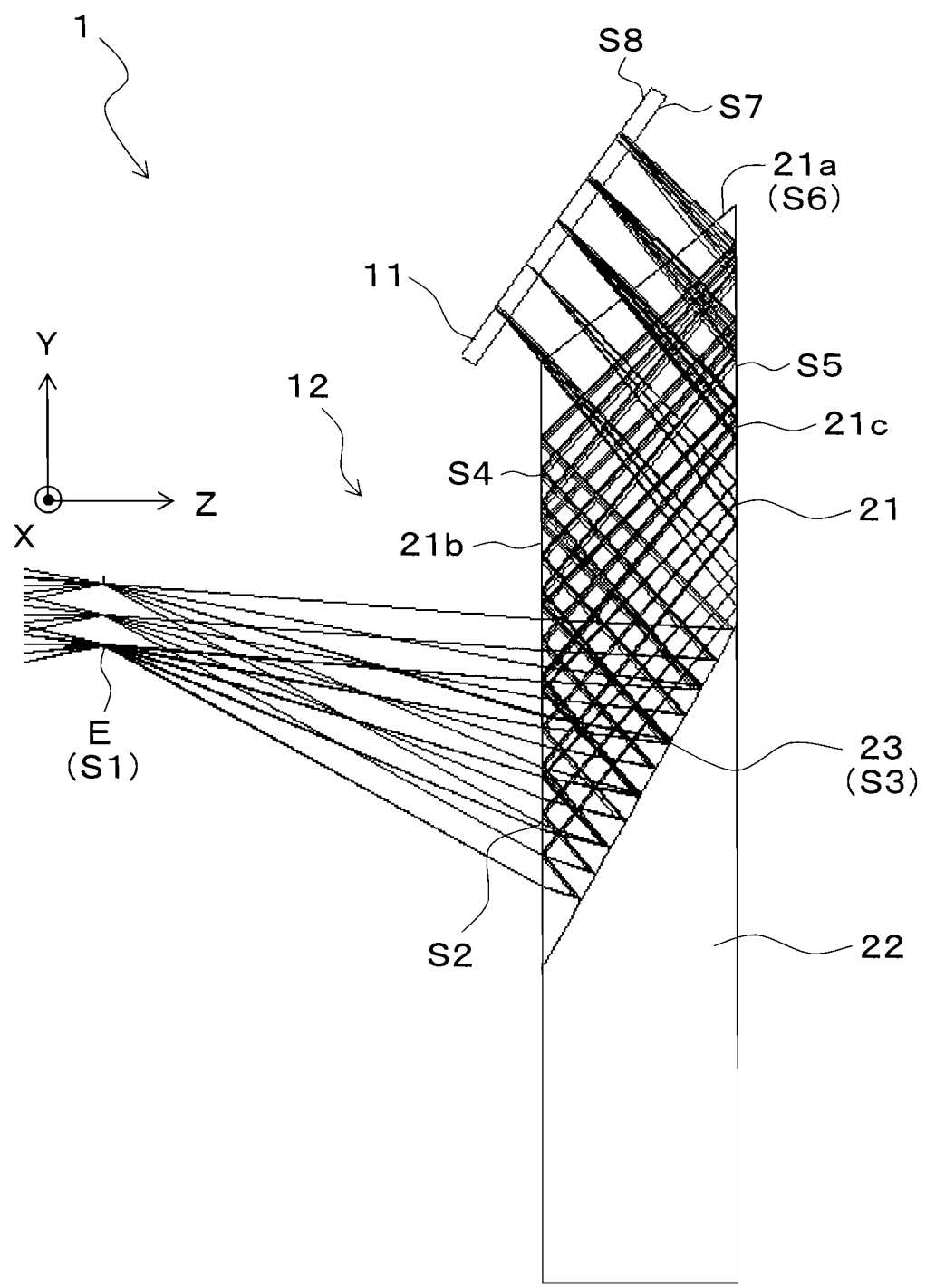
FIG. 7 is a sectional view showing a schematic structure of an image display device according to an embodiment 6 of the present invention.

The image display device 1 allows an observer to observe an external image in a see-through way, displays an image and provides the image as a virtual image to the observer. As this image display device 1, it is possible to use image display devices shown in embodiments 1 to 6 described later. The image display device 1 has a structure in which an eyepiece optical system 12 is unitarily formed with a housing 3 that houses a display element 11 (see FIG. 2) and the like. The eyepiece optical system 12, as a whole, has a shape like one lens (right-eye lens in FIG. 1) of eyeglasses. The support means 2 supports the image display device 1 in front of the observer; and corresponds to, for example, a frame and a temple of eyeglasses. Hereinafter, details of the image display device 1 are described.

2. Image Display Device

FIGS. 2 to 7 are sectional views showing schematic structures of the image display devices 1 according to the embodiments 1 to 6, respectively. The image display device 1 includes: a light source and an illuminating optical system that are not shown; the display element 11; and the eyepiece optical system 12.

Here, for convenience of the following description, directions are defined as follows. First, an axis that optically connects a center of a display region of the display element 11 to a center of an optical pupil (exit pupil) E formed by the eyepiece optical system 12 is defined as an optical axis. And, an optical-axis direction is defined as a Z direction when an optical path from the light source and to the optical pupil E is developed. Besides, a direction perpendicular to an optical-axis incidence plane of an HOE 23, described later, of the eyepiece optical system 12 is defined as an X direction; and a direction perpendicular to a ZX plane is defined as a Y direction. Here, the optical-axis incidence plane of the HOE 23 refers to a plane that includes an optical axis of incident light and an optical axis of reflected light at the HOE 23, that is, a YZ plane.

The light source is composed of, for example, a unitary-type LED of R, G, and B that emits light which have the wavelengths corresponding to the three primary colors of R, G and B. The illuminating optical system collects and guides the light emitted from the light source to the display element 11; and is composed of a collecting lens, for example.

The display element 11 modulates the light from the light source in accordance with image data to display an image; and is composed of a transmissive-type LCD, for example. The display element 11 is disposed in such a way that a long-side direction of a rectangular display screen becomes the X direction and a short-side direction of the rectangular display screen becomes the Y direction. Here, FIGS. 2 to 7 show a cover glass only that is a glass substrate on an opposite-electrode side in the display element 11.

The eyepiece optical system 12 is an optical system that guides the image light from the display element 11 to the optical pupil E (or the observer's pupil situated at the optical pupil E) via an eyepiece prism 21; and at the same time, guides external light to the optical pupil E (or the observer's pupil situated at the optical pupil E) via the eyepiece prism 21. Accordingly, the eyepiece optical system 12 doubles as an image observation optical system for guiding the image light to the optical pupil E, and a see-through optical system for guiding the external light to the optical pupil E; and has a structure in which the image observation optical system and the see-through optical system share the eyepiece prism 21 with each other.

The above eyepiece optical system 12 is so structured as to include: the above eyepiece prism 21 (a first prism, a first transparent substrate); a deflection prism 22 (a second prism, a second transparent substrate); and the HOE 23.

The eyepiece prism 21 totally reflects there-inside the image light from the display element 11 to guide the light to the optical pupil E (or the observer's pupil situated at the position of the optical pupil E) via the HOE 23 while the eyepiece prism 21 transmits the external light to guide the light to the optical pupil E (or the observer's pupil situated at the position of the optical pupil E); and together with the deflection prism 22, is composed of an acrylic resin, for example. This eyepiece prism 21 is so structured as to have a shape in which a lower end portion of a parallel flat plate is formed thinner nearer to a lower end to have a wedge shape. An upper end surface of the eyepiece prism 21 is a surface 21a as an incident surface for the image light; and two surfaces situated in a front-back direction are surfaces 21b, 21c which are opposed to and parallel to each other. Here, the surfaces 21b, 21c constitute a first reflection surface and a second reflection surface respectively that reflect the image light from the display element 11 at least one time.

The deflection prism 22 is composed of a parallel flat plate that has substantially a U-shape when viewed in a planar way (see FIG. 1); and when attached to the lower end portion and both side-surface portions (left- and right-end surfaces) of the eyepiece prism 21, is unitarily formed with the eyepiece prism 21 to become substantially a parallel flat plate. The deflection prism 22 is so disposed adjacent or adhered to the eyepiece prism 21 as to sandwich the HOE 23. According to this, it is possible to prevent a distortion from occurring in the external image which the observer observes via the eyepiece prism 21.

In other words, for example, in a case where the deflection prism 22 is not disposed, because the external light is refracted when it passes through the wedge-shape lower end portion of the eyepiece prism 21, a distortion occurs in the external image that is observed via the eyepiece prism 21. However, the unitary and substantially parallel flat plate is formed by joining the deflection prism 22 to the eyepiece prism 21, so that it is possible to cancel the refraction, by means of the deflection prism 22, at the time the external light passes through the wedge-shape lower end portion of the eyepiece prism 21. As a result of this, it is possible to prevent a distortion from occurring in the external image that is observed in the see-through way.

Besides, by joining the deflection prism 22 to the eyepiece prism 21, it is possible to increase a field-angle region (see-through region) where it is possible to clearly observe the external image without the distortion. Moreover, by joining the eyepiece prism 21 and the deflection prism 22 to each other to sandwich the HOE 23, the HOE 23 is tightly sealed, so that it is possible to curb deterioration of the HOE 23 due to contact and friction with the outside air.

The HOE 23 is a volume-phase type and reflective type of holographic optical element which diffracts and reflects the image light (light having the wavelengths corresponding to the three primary colors) from the display element 11 to guide it to the optical pupil E, thereby enlarging the image displayed by the display element 11 and guiding the image to the observer's pupil as a virtual image; and is disposed on the junction surface of the eyepiece prism 21 and the deflection prism 22. Here, in the eyepiece prism 21, the surface where the HOE 23 is disposed is called an HOE surface below. This HOE surface constitutes a third reflection surface that reflects the image light at least one time from the display element 11.

This HOE 23 has axis-asymmetrical positive power; and has the same function as that of an aspherical concave mirror that has positive power. According to this, it is possible to easily reduce the size of the device by increasing the degree of freedom of the disposition of each optical member that constitutes the device and to provide an image whose aberration is well corrected to the observer.

In the image display device 1 having the above structure, the light emitted from the light source enters the display element 11 via the illuminating optical system; is modulated there and output as the image light. The image light from the display element 11 enters the inside of the eyepiece prism 21 of the eyepiece optical system 12 from the surface 21a; subsequently enters the surface 21b (surface 21c in FIG. 7) at an critical angle or larger. And, the image light is totally reflected at least one time by each of the surfaces 21b, 21c and enters the HOE 23. The light entering the HOE 23 is diffracted and reflected there and reaches the optical pupil E. At the position of the optical pupil E, the observer is able to observe an enlarged virtual image of the image that is displayed on the display element 11.

On the other hand, the eyepiece prism 21 and the deflection prism 22 transmit almost all of the external light, so that the observer is able to observe the external image. Accordingly, the virtual image of the image displayed on the display element 11 is observed with overlapped with part of the external image.

Here, in the image display devices 1 shown in FIGS. 2 to 6, in the eyepiece prism 21, the total reflection is performed two times at the surface 21b and one time at the surface 21c. Accordingly, the reflection of the image light in the eyepiece prism 21 is, in light of the reflection at the HOE surface as well, performed four times in total. In other words, by representing by means of surface numbers in examples described later, the reflection of the image light in the eyepiece prism 21 is performed four times of S3 to S6. On the other hand, in the image display device 1 shown in FIG. 7, the total reflection at each of the surfaces 21b, 21c is performed one time, so that the reflection of the image light in the eyepiece prism 21 is, in light of the reflection at the HOE surface as well, performed three times in total. In other words, the reflection of the image light in the eyepiece prism 21 is performed three times of S3 to S5.

From the above description, it is possible to say that the eyepiece optical system 12 of the image display device 1 has, in the eyepiece prism 21, the three or more reflection surfaces (S3 to S6 or S3 to S5) that bend three or more times the light path of the image light from the display element 11. According to the structure of the eyepiece optical system 12, it becomes possible to thin the thickness of the entire eyepiece optical system 12 (especially, the eyepiece prism 21) while securing a light path that is necessary in the eyepiece optical system 12; and it becomes possible to compactly compose not only the image display device 1 but also the HMD to have a small size.

Especially, the eyepiece optical system 12, in the eyepiece prism 21, bends the light path of the image light from the display element 11 in the YZ plane, that is, the plane that is parallel with a screen short side of the display element 11 and perpendicular to a screen long side of the display element 11, so that it is possible to surely thin the thickness of the eyepiece prism 21 and surely obtain the above effects.

Besides, the HOE 23 composed of the volume-phase type and reflective type of holographic optical element has a narrow diffraction-wavelength width and has a characteristic with which the HOE 23 interacts with a specific wavelength, but does not interact with the other wavelengths. In a case where the HOE 23 is used as a combiner for the so-called see-through function to observe the display image and the external image at the same time, the HOE 23 interacts with only part of the wavelengths of the external light, so that the external light is hardly subjected to the influence of the HOE 23; and it becomes possible to observe brightly and clearly the external image in the see-through way. Besides, by overlapping the HOEs 23 that interact with different wavelengths, it is possible to observe a color image.

Besides, in the HMD of the see-through type, by matching the optical pupil of the see-through optical system with the optical pupil of the image observation optical system, it is possible to observe the external image and the virtual image of the display image from the display element 11 at the same time. In the embodiments 1 to 6, by employing a structure in which the HOE 23 of the reflective type is disposed in a portion where the light path of the see-through optical system and the light path of the image observation optical system are combined with each other; and only the rays of the image observation optical system are guided in the direction of the optical pupil, it is possible to observe the external image and the virtual image at the same time without giving almost no influence to the external image by means of the wavelength selectivity of the HOE 23. Here, to widely secure the see-through region, it is desirable that the portion for combining the light path of the see-through optical system and the light path of the image observation optical system with each other is situated close the optical pupil.

3. Various Condition Formulas

Figure 8:
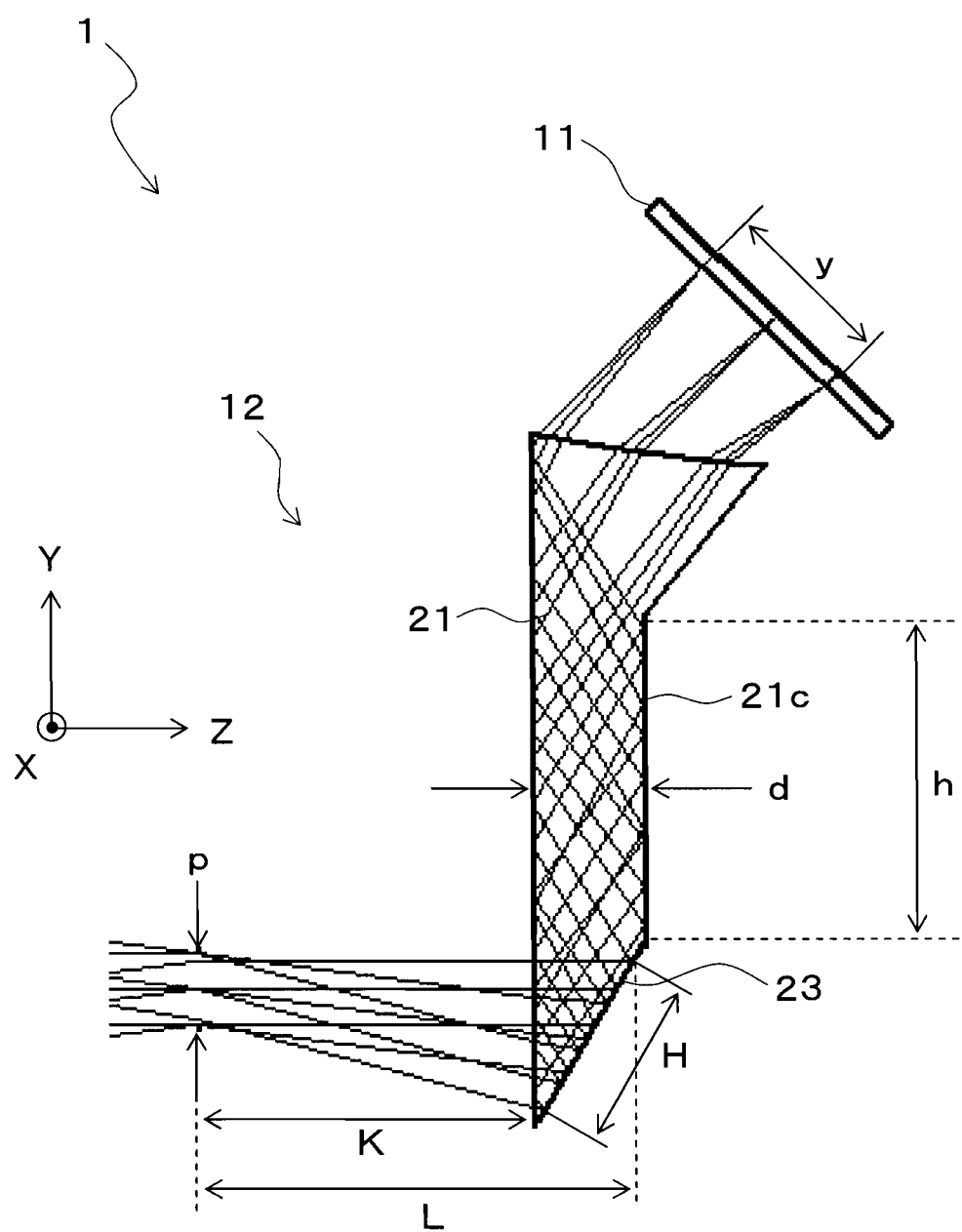
FIG. 8 is a descriptive view showing each parameter in the image display device according to the embodiment 1.

Next, various condition formulas are described. The image display device 1 according to each of the embodiments 1 to 6 meets the following condition formula (1).

$$0.8 < H/y < 1.7 \qquad (1)$$

where as shown in FIG. 8, H represents a length (mm) of a straight line that connects both ends of an incident region, for the image light, of the HOE surface in a plane that contains a screen-center principal ray; and y represents a length (mm) of the display element 11 in a screen short-side direction of the display element 11. Here, the screen-center principal ray refers to a ray that travels on the optical axis, that is, a ray that is output from the screen center of the display element 11 and enters the center of the optical pupil E. Besides, the plane that contains the screen-center principal ray refers to a plane that is defined by the three-time or more bending of the screen-center principal ray, that is, the YZ plane that contains the screen-center principal ray. Incidentally, here, the optical power of the eyepiece optical system 12 is symmetrical with respect to the above plane.

The condition formula (1) defines a thickness of the prism for securing both of the wide field-angle region (image observation region) for observing the display image and the wide field-angle region (see-through region) for observing the external image in the see-through way. A relationship between an incident area (size of the HOE surface) for the image light that enters the HOE surface and a size of the display screen of the display element 11 is suitably defined by the condition formula (1), so that it is possible to secure both of the wide image observation region and the wide see-through region and to achieve the image display device 1 that is thin and has an excellent performance with the above small-size and compact structure. More details are as follows.

If H/y becomes under a lower limit of the condition formula (1), in the plane that contains the screen-center principal ray, an effective region (diffraction reflection region) of the HOE 23 becomes small for the screen size of the display element 11. The principal rays that are output from a screen upper edge and a screen lower edge of the display element 11 enter the HOE 23 while converging; accordingly, if the effective region of the HOE 23 becomes small, it is necessary to enlarge the thickness d (see FIG. 8) of the eyepiece prism 21 so as to guide the rays to the optical pupil E without eclipsing them.

On the other hand, if H/y becomes over an upper limit of the condition formula (1), the HOE surface becomes large in the plane that contains the screen-center principal ray; and as thought, it is impossible to thin the eyepiece prism 21. Here, it is desirable that the angle formed by the HOE surface and the surface 21b where the rays are totally reflected immediately before the rays enter the HOE 23 is in a range of 25 degrees to 35 degrees in light of eclipse of the rays and thickness reduction of the eyepiece prism 21. Here, in a case where the HOE surface is a cylindrical surface described later, the above angle is an angle formed by the surface 21b and a tangential plane at an intersection of the HOE surface and the screen-center principal ray.

As described above, even if H/y becomes under the lower limit or over the upper limit of the condition formula (1), the thickness d of the eyepiece prism 21 increases; accordingly, in a case where the eyepiece prism 21 has large optical power to widen the image observation region, the value (length of the surface 21c) of h shown in FIG. 8 becomes small; and the distance between the HOE surface and the display element 11 becomes small. As a result of this, even if it is possible to secure a wide image observation region, it becomes impossible to secure a wide see-through region over an upper portion of the image observation region.

Accordingly, by meeting the condition formula (1), it is possible to curb the increase in the thickness d of the eyepiece prism 21 and widely secure both of the image observation region and the see-through region; especially, it becomes possible to widely secure the see-through region over the image observation region.

Besides, if H/y becomes under the lower limit of the condition formula (1), it becomes hard to obtain a telecentric structure on the display element 11 aide; and a problem that the illumination in a peripheral portion of the screen deteriorates occurs. In other words, the display element 11 has an angle characteristic; if the value of y becomes large, the ray enters obliquely the display element 11 when considering back tracing from the optical pupil E, so that the contrast deteriorates. However, by meeting the condition formula (1), it is possible to obtain the telecentric structure on the display element 11 side; and it is possible to avoid the deterioration of the illumination in the peripheral portion of the screen and the deterioration of the contrast in the peripheral portion of the screen.

Here, it is desirable that the image display device 1 further meets the following formula (1a).

$$0.8 < H/y < 1.6 \qquad (1a)$$

Figure 9:
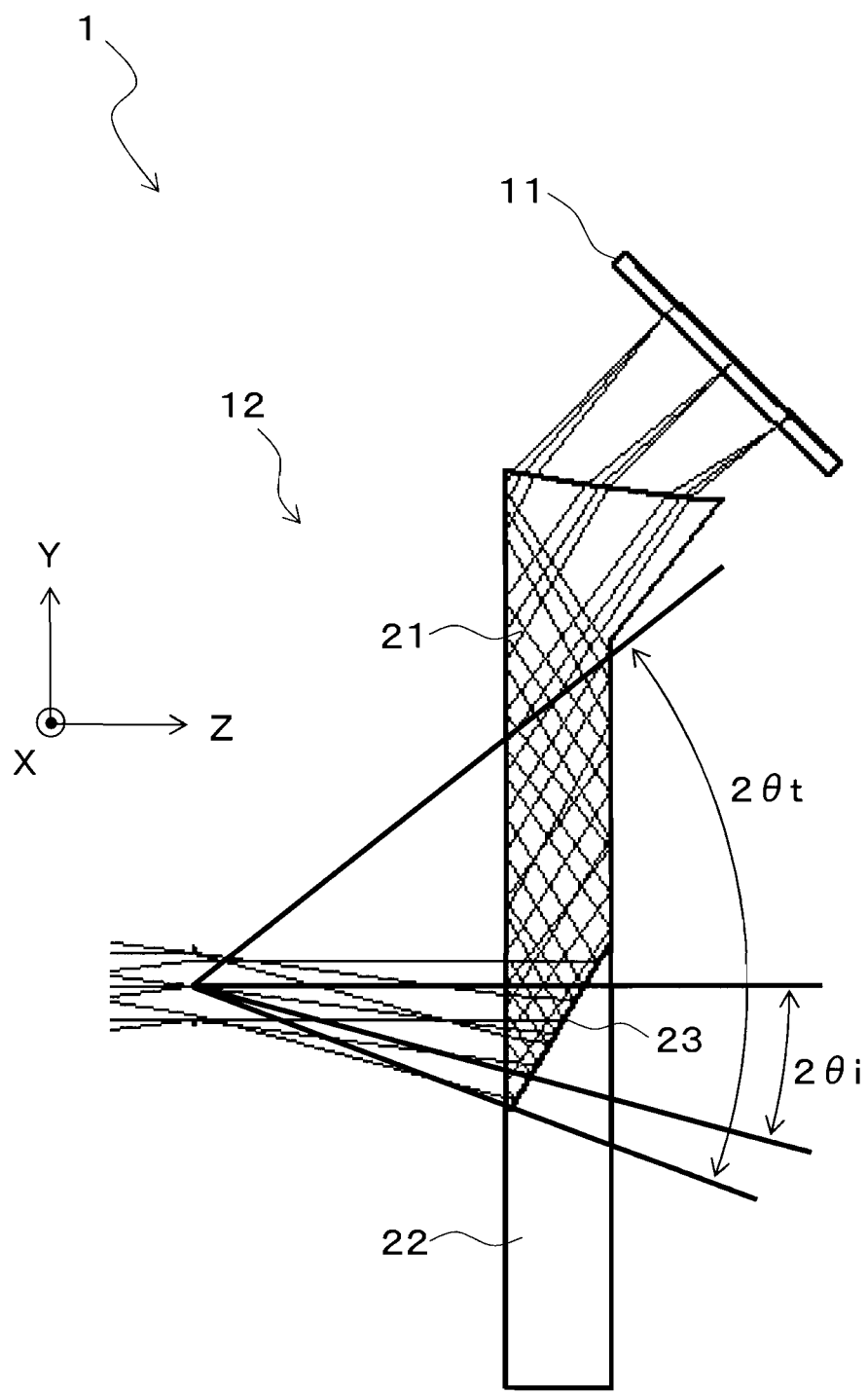
FIG. 9 is a descriptive view showing each parameter in the image display device according to the embodiment 1.

Besides, the image display device 1 according to each of the embodiments 1 to 6 meets the following formula (2).

$$1.2 < f/(p + K \cdot \tan(2\theta i)) < 5.5 \qquad (2)$$

where f represents a focal length (mm) of the eyepiece optical system 12 in the vicinity of the screen-center principal ray in the plane that contains the screen-center principal ray. Besides, as shown in FIGS. 8 and 9, p represents a length (mm) of the optical pupil E formed by the eyepiece optical system 12 in a direction that corresponds to the screen short-side direction; K represents a distance (mm) from an output surface, for the image light, of the eyepiece prism 21 to the optical pupil E; and θi represents half (°) of an observation field angle of the display image in the eyepiece optical system 12 in the plane that contains the screen-center principal ray. In other words, the denominator of the condition formula (2) corresponds to a light-flux width of the image light in the screen short-side direction on the output surface of the eyepiece prism 21.

The condition formula (2) defines a condition for achieving the thickness reduction of the eyepiece prism 21 and the size reduction of the entire image display device 1 at the same time. In other words, if f/(p+K·tan(2θi)) becomes under a lower limit of the condition formula (2), the focal length (distance between the HOE surface and the image surface (display surface of the display element 11)) of the eyepiece optical system 12 becomes short for the observation field angle of the image at the eyepiece prism 21, so that it is impossible to bend the light path of the eyepiece optical system 12 in the eyepiece prism 21 three times or more and the thickness d of the eyepiece prism 21 becomes large. In contrast, if f/(p+K·tan(2θi)) becomes over an upper limit of the condition formula (2), the focal length of the eyepiece optical system 12 becomes long and the entire image display device 1 becomes large.

Accordingly, by meeting the condition formula (2), it is possible to achieve the thickness reduction of the eyepiece prism 21 and the size reduction of the image display device 1 at the same time, so that it is possible to achieve the image display device 1 that is compact and wide in the see-through region.

Besides, if f/(p+K·tan(2θi)) becomes under the lower limit of the condition formula (2), the display element 11 comes into a visual region (image observation region) of the observer when the observation field angle of the image light is widened (when the optical power of the eyepiece optical system 12 is enlarged), which results in a structure in which the observer feels stressed during a use time. However, by meeting the condition formula (2), it is possible to situate the display element 11 outside the visual region and give no feeling of oppression to the observer.

Here, it is desirable that the image display device 1 further meets the following condition formula (2a).

$$1.5 < f/(p + K \cdot \tan(2\theta i)) < 3.5 \qquad (2a)$$

Besides, in the eyepiece optical system 12, for the size reduction, it is preferable that on a section (YZ plane) in the screen short-side direction, the ray (in the figure, the ray at the lowest end of the image light flux which enters the optical pupil E) closest to the HOE surface in the eyepiece prism 21 is substantially parallel with the HOE surface; and it is preferable that a side of the eyepiece optical system 12 close to the display element 11 is substantially telecentric.

On the other hand, to reduce the chromatic aberration of magnification of the eyepiece optical system 12, it is preferable that the optical power of the HOE 23 is substantially symmetrical, in the section in the screen short-side direction, with respect to an intersection of the screen-center principal ray and the HOE 23.

In light of the above points, the angle formed by the screen-center principal ray and the HOE surface and the angle formed by the prism output surface (surface 21b) and the HOE surface are in a range of 25° to 40°.

Besides, the image display device 1 according to each of the embodiments 1 to 6 meets the following condition formula (3).

$$1.1 < \theta t/\theta i < 7 \qquad (3)$$

where as shown in FIG. 9, θt represents half (°) of the observation field angle of the external image formed by the external light that travels in the eyepiece prism 21 in the plane that contains the screen-center principal ray.

The condition formula (3) defines a ratio of the field angle of the external image to the field angle of the image, that is, a ratio of the see-through region to the image observation region. If θt/θi becomes under a lower limit of the condition formula (3), it is impossible to secure the see-through region over the image observation region; and the display element 11 is situated in the visual region, which results in a structure in which the observer feels oppressed. In contrast, if θt/θi becomes over an upper limit of the condition formula (3), it is necessary to lengthen the length in a vertical direction of the eyepiece prism 21 of the eyepiece optical system 12 to secure the see-through region, so that the eyepiece prism 21 becomes large and heavy and the burden on the observer increases during the use time.

Accordingly, be meeting the condition formula (3), it is possible to reduce the feeling of stress and the burden given to the observer during the use time.

Here, it is desirable that the image display device 1 further meets the following condition formula (3a).

$$1.5 < \theta t/\theta i < 3 \tag{3a}$$

4. Correction of Chromatic Aberration of Magnification

In the meantime, in the HMD of the see-through type, if large optical power is given to the HOE 23 to widen the image observation region (observation field angle), a chromatic aberration of magnification due to the color dispersion at the HOE 23 notably occurs. This chromatic aberration of magnification is described in detail as follows.

Figure 10:
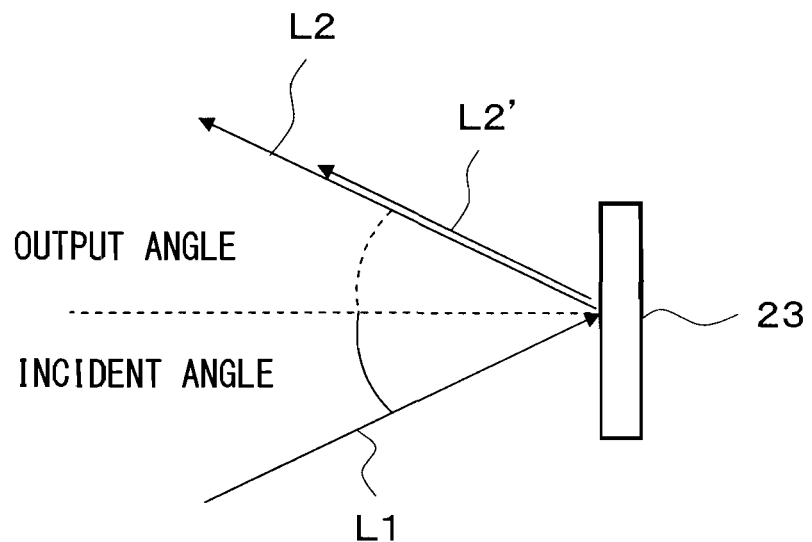
FIG. 10 is a descriptive view schematically showing optical paths of an incident ray (reproduction ray) and of an output ray in a case where a difference between an incident angle and an output angle with respect to an HOE is small.
Figure 11:
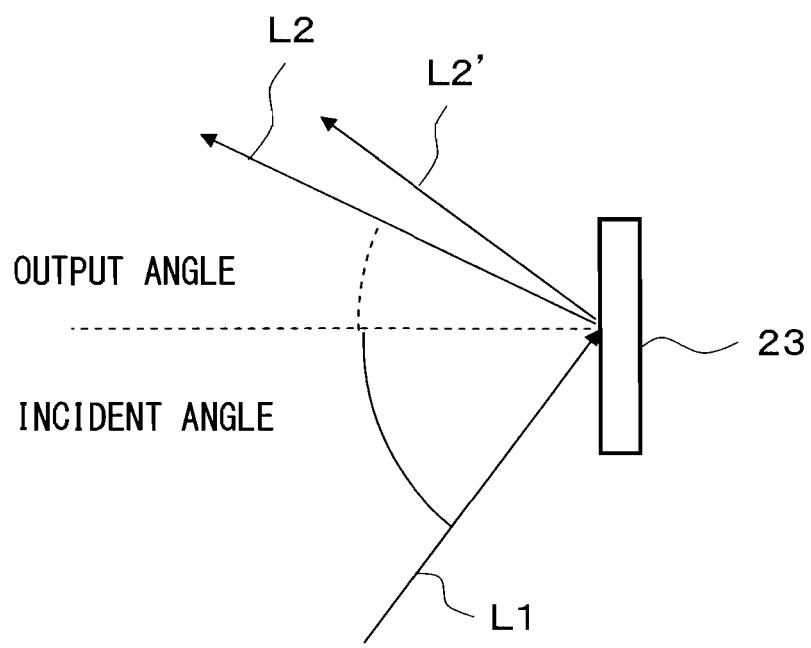
FIG. 11 is a descriptive view schematically showing optical paths of an incident ray (reproduction ray) and of an output ray in a case where a difference between an incident angle and an output angle with respect to an HOE is large.

As shown in FIG. 10 and FIG. 11, it is supposed that when a reproduction ray L1 having a predetermined wavelength is input into the HOE 23, an output ray L2 is output; and when the wavelength of the reproduction ray L1 changes, an output ray L2' is output from the HOE 23. As shown in FIG. 10, in a case where a difference between the incident angle and the output angle with respect to the HOE is small, a change of a directional vector of the output ray L2' with respect to the output ray L2 is small. On the other hand, as shown in FIG. 11, in a case where the difference between the incident angle and the output angle with respect to the HOE is large, the change of the directional vector of the output ray L2' with respect to the output ray L2 is large. In other words, if the wavelength of the reproduction ray L1 changes, the output angle of the output ray L2' considerably changes.

Figure 12:
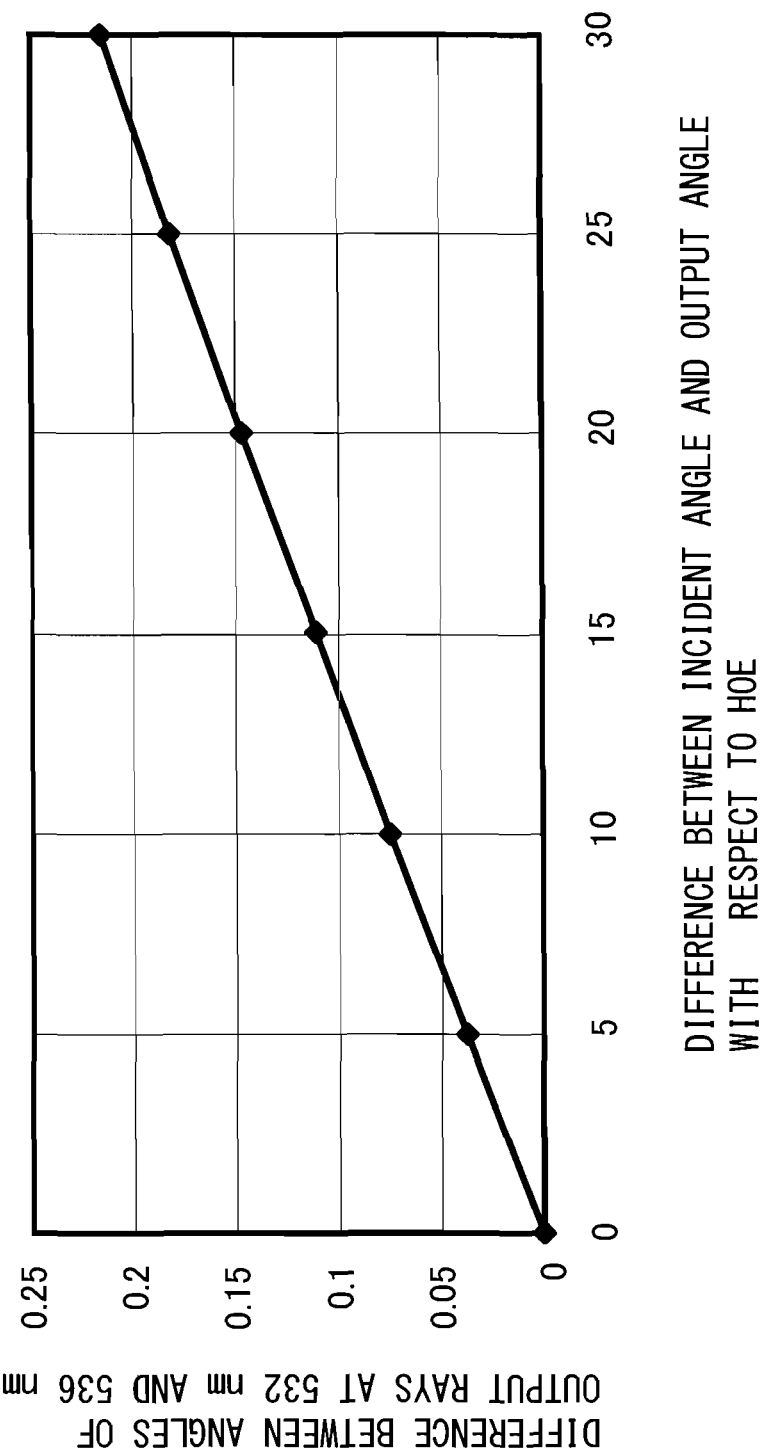
FIG. 12 is a graph showing a relationship between: a difference between an incident angle and an output angle when a ray having a predetermined wavelength is input into an HOE and a difference between output angles corresponding different-wavelength output rays.

Here, FIG. 12 graphs: differences between the incident angle at the time the reproduction ray L1 having the wavelength of 532 nm is input into the HOE and the output angle of the output ray L2 when the fabrication wavelength of the HOE is 532 nm; and differences between the output angle of the output ray L2 having the wavelength of 532 nm and the output angle of the output ray L2' having a wavelength of 536 nm. It is understood that as the difference on the horizontal axis between the incident angle and the output angle becomes large, the change, indicated by the vertical axis, between the output angles in the time the wavelengths are changed also becomes large.

In the eyepiece optical system 12, at the intersection of the screen-center principal ray and the HOE, the incident angle and the output angle of the reproduction ray are equal to each other. Accordingly, as the distance from the screen center becomes long, the difference between the incident angle and the output angle of the reproduction ray with respect to the HOE becomes large, so that the change in the output angle at the time the wavelength of the reproduction ray changes becomes large. As a result of this, at an end portion of the HOE, the chromatic aberration of magnification notably occurs at the image observation time compared with the central portion. Here, for example, the change in the wavelength of the reproduction ray is caused by a deviation between the utilized wavelengths at a fabrication time and a reproduction time or caused by a characteristic change due to the use of the light source at the reproduction time.

Accordingly, it is desirable that the optical power is given to the reflection surface (HOE surface) formed on the HOE 23 in the eyepiece prism 21; and the HOE 23 and the HOE surface share the optical power of the eyepiece optical system 12 with each other. According to this, it is possible to reduce the burden of the optical power given to the HOE 23 and becomes possible to correct the chromatic aberration of magnification caused by the color dispersion at the HOE 23.

Here, in the eyepiece prism 21, the optical power may be or may not be given to a surface (surface 21b, 21c) which is a reflection surface other than the HOE surface and through which a see-through ray (external light) passes. If the surfaces 21b, 21c have substantially no power, the observer is able to observe the external image without distortion. In contrast, if the optical power is given to the surfaces 21b, 21c, it becomes possible to use the HMD as a correctional glasses lens.

Here, as the shape of the HOE surface, there are a spherical surface, an aspherical surface, an anamorphic surface, a cylindrical surface, a free curved surface and the like; however, it is desirable that the shape is an anamorphic shape having rotationally asymmetrical optical power. The screen size of the display element 11, that is, the observation field angle in the X direction corresponding to the screen long-side direction of the display element 11 is different from the observation field angle in the Y direction corresponding to the screen short-side direction of the display element 11, so that the chromatic aberrations of magnification caused by the color dispersion at the HOE are different from each other in the above both directions (a larger chromatic aberration of magnification occurs in the X direction than in the Y direction). However, by using an anamorphic shape as the HOE surface, it becomes possible to correct the chromatic aberration of magnification in a good-balanced way in the X direction and the Y direction.

Especially, in the HOE surface, it is desirable that the focal length in the X direction corresponding to the screen long-side direction of the display element 11 is smaller than the focal length in the Y direction corresponding to the screen short-side direction of the display element 11. In other words, it is desirable that the optical power of the HOE surface is larger in the X direction than in the Y direction. Here, the optical power of the HOE surface described here refers to the optical power in the vicinity of the intersection of the screen-center principal ray and the HOE surface.

In the HOE surface, toward both ends of the HOE surface, the difference between the incident angle of the ray entering the HOE surface and the output angle of the ray output from the HOE surface becomes large, so that the chromatic aberration of magnification occurs more notably in the X direction than in the Y direction. However, by making the optical power of the HOE surface larger in the X direction than in the Y direction, it is possible to reduce in the X direction the optical power that the HOE 23 shares, so that it becomes possible to curb the chromatic aberration of magnification that occurs more notably at both ends in the X direction.

Besides, it is desirable that the HOE surface is a cylindrical surface. The HOE 23 is usually fabricated by attaching a hologram photosensitive material (e.g., photopolymer) to a surface of the eyepiece prism 21 and exposing it to two lines of light flux. If the HOE surface is a cylindrical surface, compared with a case where the HOE surface is composed of another shape that has the optical power, it becomes possible to use a film-like material as the hologram photosensitive material; and attach evenly and easily the hologram photosensitive material to the above surface of the eyepiece prism 21. According to this, it becomes possible to easily fabricate the eyepiece optical system 12 and easily obtain the HMD that has a wide field angle.

From the viewpoint of reducing the optical power in the X direction given to the HOE 23 and effectively correcting the chromatic aberration of magnification that occurs notably at both ends in the X direction, it is desirable that the HOE surface having the cylindrical surface has the optical power in the X direction that corresponds to the screen long-side direction of the display element 11.

Besides, in the case where the HOE surface is the cylindrical surface, it is desirable that the image display device 1 meets the following condition formula (4).

$$0.02<|L/R|<0.5 \qquad (4)$$

where as shown in FIG. 8, L represents a distance (mm) to a point farthest from the optical pupil E in the incident region, for the image light from the display element 11, of the cylindrical surface (HOE surface) in the plane that contains the screen-center principal ray. Besides, R represents a radius (mm) of curvature of the cylindrical surface.

The condition formula (4) defines balance between the correction of the chromatic aberration of magnification and the correction of distortion aberration. In other words, if |L/R| becomes under a lower limit of the condition formula (4), the optical power of the cylindrical surface becomes small, and the optical power that the HOE 23 shares becomes large. As a result of this, because of the color dispersion at the HOE 23, the chromatic aberration of magnification in the eyepiece optical system 12 occurs notably, so that it becomes hard to correct in a good-balanced way the chromatic aberration of magnification in the X direction corresponding to the screen long-side direction and the chromatic aberration of magnification in the Y direction corresponding to the screen short-side direction. In contrast, if |L/R| becomes over an upper limit of the condition formula (4), the optical power of the cylindrical surface becomes large, so that it becomes hard to correct a large barrel-shape distortion aberration that occurs in the eyepiece optical system 12; and it becomes impossible to obtain good performance.

Figure 13:
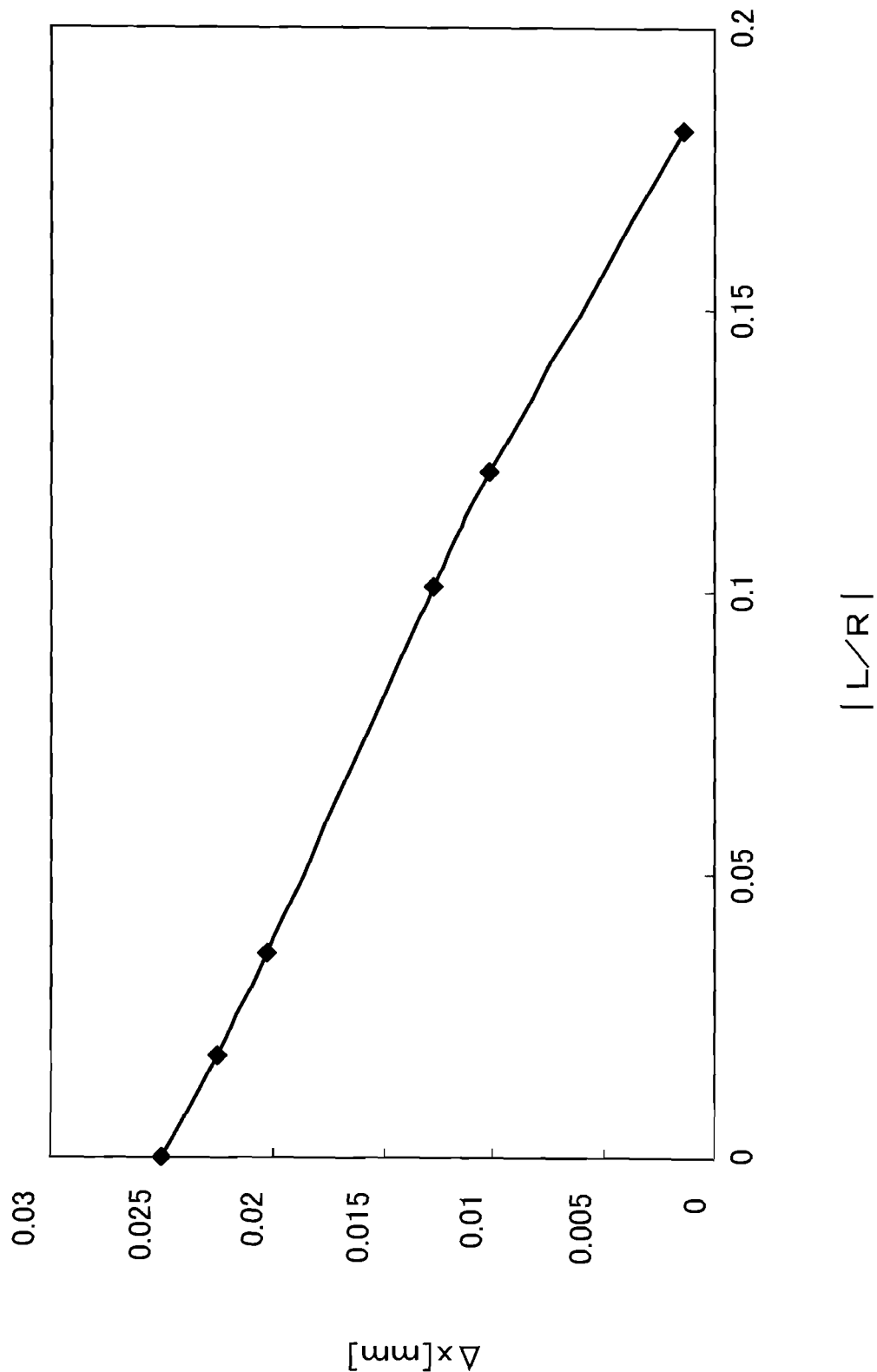
FIG. 13 is a graph showing a change of chromatic aberration of magnification when a radius of a cylindrical surface that constitutes an HOE surface is changed.

Here, FIG. 13 represents results of the amount of chromatic aberration of magnification in the X direction obtained by changing the radius of the cylindrical surface when the HOE surface is the cylindrical surface that has the optical power in the X direction. Here, the cylindrical surface has a concave-surface shape when viewed from the optical pupil E side. Besides, as for the chromatic aberration of magnification, differences (Δx) between X-coordinate values at an intersection of the display element 11 and the principal ray that enters from the optical pupil E side and reaches the lower end of the display element 11 are obtained for the wavelengths of 536 nm and 532 nm.

As seen from FIG. 13, in a case where the radius of curvature of the cylindrical surface is large and the optical power of the cylindrical surface is small, the value of Δx is large and the effect of reducing the color dispersion is small. On the other hand, as the radius of curvature of the cylindrical surface becomes small and the optical power of the cylindrical surface becomes large, the color dispersion at the HOE 23 becomes small and the chromatic aberration of magnification at the image surface becomes small. Here, if the optical power of the cylindrical surface is increased too much, it becomes impossible to correct the chromatic aberration that occurs at the incident surface (surface 21a) of the eyepiece prism 21 and the chromatic aberration that occurs at the output surface (surface 21b) of the eyepiece prism 21, so that the chromatic aberration increases again. Besides, if the optical power of the cylindrical surface increases, the correction of the distortion aberration becomes hard.

Accordingly, by meeting the condition formula (4), it is possible to correct the chromatic aberration of magnification and the distortion aberration in a good-balanced way. Besides, by using the cylindrical surface having the optical power in the X direction as the HOE surface and forming the above cylindrical surface into the concave surface when viewed from the optical pupil E side, it is possible to decrease the incident angle of a ray having a large field angle in the X direction to the HOE 23. According to this, it is possible to surely decrease the color dispersion at the HOE and surely correct the chromatic aberration of magnification in the X direction.

Besides, in the case where the HOE surface is the cylindrical surface, it is desirable that the image display device 1 further meets the following formula (4a).

$$0.02<|L/R|<0.3 \qquad (4a)$$

5. Examples

Hereinafter, examples of the image display devices 1 according to the respective embodiments 1 to 6 are more specifically described as examples 1 to 6 by means of construction data and the like. The examples 1 to 6 are numerical examples that correspond to the respective embodiments 1 to 6; and optical structural views (FIG. 2 to FIG. 7) showing the respective embodiments 1 to 6 are applicable to the examples 1 to 6 as they are.

Here, in the construction data indicated below, Si (i=1, 2, 3, ... ) represents the i-th surface (the optical pupil E is the first surface) counted from the optical pupil E. Besides, in the cover glass (CG) of the display device 11, a surface close the eyepiece optical system 12 is defined as a CG surface and a surface close to the light source is defined as an image surface (display surface).

The disposition of each surface Si is specified by the respective surface data of coordinates (x,y,z) of the top of the surface and rotation angles (ADE). The coordinates of the top of the surface Si are expressed (the unit is mm) by the origin coordinates (x,y,z) of a local rectangular-coordinates system (X,Y,Z) in a global rectangular-coordinates system (x,y,z) when the top of the surface is regarded as the origin of a local rectangular-coordinates system (X,Y,Z). Besides, the slope of the surface Si is expressed by the rotation angle (X rotation) about the X axis with the top of the surface used as the center. Here, the unit of the rotation angle is °, and a counterclockwise direction viewed from the positive direction of the X axis is defined as a positive direction of the rotation angle of the X rotation.

Besides, the global rectangular-coordinates system (x,y,z) is an absolute coordinates system that matches with the local rectangular-coordinates system (X, Y, Z) at the optical-pupil plane (S1). In other words, the disposition data of each surface Si are expressed by the global coordinates system that has the optical-pupil plane center as the origin. Here, on the optical-pupil plane (S1), a direction extending from the optical pupil E to the eyepiece optical system 12 is a +Z direction; an upward direction with respect to the optical pupil E is a +Y direction; and a direction (direction extending from left to right when the HMD is mounted) which is perpendicular to the YZ plane and extends from behind the paper sheet of FIG. 2 to a front of the paper sheet is a +X direction.

Besides, both of the fabrication wavelength (HWL: standardized wavelength) for fabricating the HOE used in each of the examples and the reproduction wavelength are 532 nm; and the utilized order for the diffraction light is the first order. As for the HOE surface, the HOE is clearly defined by defining the two lines of light flux used for the fabrication. The definition of the two lines of light flux is performed based on the light-source position of each line of light flux and whether an output beam from each light source is a convergent beam (VIA) or a divergent beam (REA). Here, the coordinates of a first point light source (HV1) and the coordinates of a second point light source (HV2) are defined as (HX1, HY1, HZ1) and (HX2, HY2, HZ2), respectively.

Besides, because complicated wavefront reproduction is performed by the HOE in each example, besides the definition of the two lines of light flux, the HOE is also defined by a phase function $\phi$. The phase function $\phi$ is, as represented by the following numerical formula 1, a polynomial expression generated with the position (X, Y) of the HOE and expressed with monomials that have coefficients in an ascending order from the first to tenth degree. In the construction data, the coefficient $Cj$ of the phase function $\phi$ is represented.

$$\phi = C_1 X + C_2 Y + C_3 X^2 + C_4 XY + C_5 Y^2 + \ldots C_{65} Y^{10} \quad \text{(Numerical Formula 1)}$$

Here, the number j of the coefficient $Cj$ is expressed by the following numerical formula 2 with m, n used as exponents of X, Y.

$$j = \{(m+n)^2 + m + 3n\}/2 \quad \text{(Numerical Formula 2)}$$

Here, in the HOE surface, when the normal vectors of the output ray are defined as p', q', and r', respectively; the normal vectors of the incident ray are defined as p, q, and r, respectively; the wavelength of the reproduction light flux is defined as $\lambda$ (nm); and the wavelength of the light flux for fabricating the HOE is defined as $\lambda_0$ (nm), p', q', and r' are expressed by the following numerical formula 3.

$$p' = p + \frac{\partial \phi}{\partial X} \cdot \frac{\lambda}{\lambda 0} \quad \text{(Numerical Formula 3)}$$

$$q' = q + \frac{\partial \phi}{\partial Y} \cdot \frac{\lambda}{\lambda 0}$$

$$r' = r + \sqrt{1 - p'^2 - q'^2}$$

As described above, in the examples 1 to 6, by means of the light source that emits the light having the wavelength of 532 nm, the hologram photosensitive material is exposed to light to obtain the phase function $\phi$ of the HOE corresponding to the wavelength of 532 nm. After the phase function $\phi$ corresponding to the above wavelength is obtained, by means of a light source that emits light having another wavelength, the hologram photosensitive material undergoes multi-exposure to light, so that it is possible to make the eyepiece optical system 12 compatible with color display.

Besides, in the construction data, a surface shape of a rotation-symmetry aspherical surface is expressed by the following numerical formula 4, where Z represents a sag (mm) in the Z-axis direction (optical-axis direction) at a height h; c represents a curvature (1/mm) at a top of a surface; h represents a height, that is, a distance (mm) from the Z axis (optical axis); k represents a conic constant; A, B, C, D, E, F, and G represent the fourth-, sixth-, eighth-, tenth-, twelfth-, fourteenth-, and sixteenth-degree coefficients (aspherical-surface coefficients). Here, in all of the data, the coefficients of the terms having no notations are zero and E-n=×10$^n$.

(Numerical Formula 4)

$$Z = \frac{ch^2}{1 + \sqrt{1 - (1+k)c^2 h^2}} + Ah^4 + Bh^6 + Ch^8 + Dh^{10} + Eh^{12} + Fh^{14} + Gh^{16}$$

Moreover, a surface shape of an anamorphic aspherical surface is expressed by the following numerical formula 5, where Z represents a sag (mm) in the Z-axis direction; CUX represents a curvature (1/mm) in the X direction, that is, an inverse number of a radius RX of curvature in the X direction; CUY represents a curvature (1/mm) in the Y direction, that is, an inverse number of a radius RY of curvature in the Y direction. Besides, KX and KY represent conic constants in the X direction and the Y direction, respectively. Moreover, AR, BR, CR, and DR represent rotation-symmetry components of the fourth-, sixth-, eighth-, and tenth-degree aspherical-surface coefficients, respectively; AP, BP, CP, and DP represent non-rotation-symmetry components of the fourth-, sixth-, eighth-, and tenth-degree aspherical-surface coefficients, respectively;

(Numerical Formula 5)

$$Z = \frac{CUX \cdot X^2 + CUY \cdot Y^2}{1 + \sqrt{1 - (1+KX)CUX^2 \cdot X^2 - (1+KY)CUY^2 \cdot Y^2}} +$$

$$AR\{(1-AP) \cdot X^2 + (1+AP) \cdot Y^2\}^2 + BR\{(1-BP) \cdot X^2 + (1+BP) \cdot Y^2\}^3 +$$

$$CR\{(1-CP) \cdot X^2 + (1+CP) \cdot Y^2\}^4 + DR\{(1-DP) \cdot X^2 + (1+DP) \cdot Y^2\}^5$$

Example 1

| SURFACE NUMBER | | RADIUS OF CURVATURE | MEDIUM | |
|---|---|---|---|---|
| S1 | PUPIL PLANE | INFINITY | AIR | PUPIL DIAMETER 3 mm |
| S2 | OUTPUT SURFACE | INFINITY | PMMA | |
| S3 | HOE SURFACE | INFINITY | REFLECTION SURFACE | |
| | DEFINITION OF TWO LINES OF LIGHT FLUX | | | |
| | HV1; REA | HV2; VIR | | |
| | HX1; 0.000000E+00 | HY1; −2.145037E+00 | HZ1; −2.423923E+01 | |
| | HX2; 0.000000E+00 | HY2; 2.485100E+08 | HZ2; −6.062901E+09 | |
| | HWL; 532 | | | |
| | | PHASE COEFFICIENT | | |
| | C2; 4.1038E−02 | C3; 2.3197E−03 | C5; 6.9577E−03 | |
| | C7; −3.3985E−05 | C9; −5.5937E−05 | C10; −1.2334E−05 | |
| | C12; −2.8534E−05 | C14; −2.2101E−05 | C16; −1.4431E−06 | |
| | C18; −1.7112E−06 | C20; 2.2345E−06 | C21; −1.1777E−09 | |
| | C23; 6.5757E−09 | C25; −3.7058E−08 | C27; 2.0720E−07 | |
| | C29; 1.3866E−08 | C31; −1.7689E−08 | C33; 4.7113E−08 | |
| | C35; −1.5934E−07 | C36; 0.0000E+00 | C38; 0.0000E+00 | |
| | C40; 0.0000E+00 | C42; 0.0000E+00 | C44; 0.0000E+00 | |

|   |   |   |   |   |
|---|---|---|---|---|
|   | C46; 0.0000E+00 | C48; 0.0000E+00 | C50; 0.0000E+00 |   |
|   | C52; 0.0000E+00 | C54; 0.0000E+00 | C55; 0.0000E+00 |   |
|   | C57; 0.0000E+00 | C59; 0.0000E+00 | C61; 0.0000E+00 |   |
|   | C63; 0.0000E+00 | C65; 0.0000E+00 |   |   |
| S4 | THIRD REFLECTION SURFACE | INFINITY | REFLECTION SURFACE |   |
| S5 | SECOND REFLECTION SURFACE | INFINITY | REFLECTION SURFACE |   |
| S6 | FIRST REFLECTION SURFACE | INFINITY | REFLECTION SURFACE |   |
| S7 | INCIDENT SURFACE (ASPHERICAL SURFACE) | 135.8204 | AIR |   |
|   | k; 0 | A; 1.85925E−04 | B; −1.42319E−05 |   |
|   | C; 7.07555E−07 | D; −1.82406E−08 | E; 2.55630E−10 |   |
|   | F; −1.83443E−12 | G; 5.34636E−15 |   |   |
| S8 | CG SURFACE | INFINITY | BK7 |   |
| S9 | DISPLAY SURFACE | INFINITY |   |   |

| SURFACE NUMBER | x | y | z | ADE |
|---|---|---|---|---|
| S1 | 0 | 0 | 0 | 0 |
| S2 | 0 | −2.000 | 14.000 | 0.000 |
| S3 | 0 | −2.000 | 16.350 | −31.000 |
| S4 | 0 | 1.500 | 14.000 | 0 |
| S5 | 0 | 9.000 | 18.700 | 0 |
| S6 | 0 | 17.000 | 14.000 | 0 |
| S7 | 0 | 22.274 | 19.000 | 82.099 |
| S8 | 0 | 27.630 | 23.765 | 45.647 |
| S9 | 0 | 28.202 | 24.324 | 45.647 |

FIELD ANGLE
X DIRECTION; −13.1° to 13.1°
Y DIRECTION; −15° to 0°

Example 2

| SURFACE NUMBER |   | RADIUS OF CURVATURE | MEDIUM |   |
|---|---|---|---|---|
| S1 | PUPIL PLANE | INFINITY | AIR | PUPIL DIAMETER 3 mm |
| S2 | OUTPUT SURFACE | INFINITY | PMMA |   |
| S3 | HOE SURFACE (SPHERICAL SURFACE) | −298.9958 | REFLECTION SURFACE |   |
|   | DEFINITION OF TWO LINES OF LIGHT FLUX |   |   |   |
|   | HV1; REA | HV2; VIR |   |   |
|   | HX1; 0.000000E+00 | HY1; −5.881204E+00 | HZ1; −1.668113E+01 |   |
|   | HX2; 0.000000E+00 | HY2; 2.485100E+08 | HZ2; −6.062901E+09 |   |
|   | HWL; 532 |   |   |   |
|   | PHASE COEFFICIENT |   |   |   |
|   | C2; 2.8590E−01 | C3; 1.2283E−02 | C5; 1.3066E−02 |   |
|   | C7; −2.9177E−04 | C9; −2.2883E−04 | C10; −2.7068E−05 |   |
|   | C12; −4.4477E−05 | C14; −3.8149E−05 | C16; 6.7067E−08 |   |
|   | C18; −6.8171E−06 | C20; −9.4960E−06 | C21; 2.8217E−07 |   |
|   | C23; −1.4597E−07 | C25; 1.2215E−06 | C27; 2.7292E−06 |   |
|   | C29; −3.8156E−08 | C31; 7.2240E−08 | C33; 2.1242E−07 |   |
|   | C35; 2.5148E−07 | C36; −5.6472E−09 | C38; 5.5861E−09 |   |
|   | C40; 2.4856E−09 | C42; −5.0000E−08 | C44; −9.0279E−08 |   |
|   | C46; 0.0000E+00 | C48; 0.0000E+00 | C50; 0.0000E+00 |   |
|   | C52; 0.0000E+00 | C54; 0.0000E+00 | C55; 0.0000E+00 |   |
|   | C57; 0.0000E+00 | C59; 0.0000E+00 | C61; 0.0000E+00 |   |
|   | C63; 0.0000E+00 | C65; 0.0000E+00 |   |   |
| S4 | THIRD REFLECTION SURFACE | INFINITY | REFLECTION SURFACE |   |
| S5 | SECOND REFLECTION SURFACE | INFINITY | REFLECTION SURFACE |   |
| S6 | FIRST REFLECTION SURFACE | INFINITY | REFLECTION SURFACE |   |
| S7 | INCIDENT SURFACE (ASPHERICAL SURFACE) | −127.826293 | AIR |   |
|   | k; 0 | A; 1.30052E−04 | B; −5.79585E−06 |   |
|   | C; 1.17700E−07 | D; −7.88409E−10 |   |   |

-continued

| | | x | y | z | ADE |
|---|---|---|---|---|---|
| S8 | CG SURFACE | | INFINITY | BK7 | |
| S9 | DISPLAY SURFACE | | INFINITY | | |

| SURFACE NUMBER | x | y | z | ADE |
|---|---|---|---|---|
| S1 | 0 | 0 | 0 | 0 |
| S2 | 0 | −2.000 | 14.000 | 0.000 |
| S3 | 0 | −2.000 | 16.350 | −31.000 |
| S4 | 0 | 1.500 | 14.000 | 0 |
| S5 | 0 | 9.000 | 18.700 | 0 |
| S6 | 0 | 17.000 | 14.000 | 0 |
| S7 | 0 | 21.916 | 19.000 | 73.275 |
| S8 | 0 | 28.729 | 23.765 | 44.970 |
| S9 | 0 | 29.294 | 24.331 | 44.970 |

FIELD ANGLE
X DIRECTION; −13.1° to 13.1°
Y DIRECTION; −15° to 0°

Example 3

| SURFACE NUMBER | | RADIUS OF CURVATURE | MEDIUM | |
|---|---|---|---|---|
| S1 | PUPIL PLANE | INFINITY | AIR | PUPIL DIAMETER 3 mm |
| S2 | OUTPUT SURFACE | INFINITY | PMMA | |
| S3 | HOE SURFACE (ANAMORPHIC SURFACE) RX; −161.5982 RY; −117.1921 | | REFLECTION SURFACE | |
| | DEFINITION OF TWO LINES OF LIGHT FLUX | | | |
| | HV1; REA | HV2; VIR | | |
| | HX1; 0.000000E+00 | HY1; −5.014401E+00 | HZ1; −1.687657E+01 | |
| | HX2; 0.000000E+00 | HY2; 2.485100E+08 | HZ2; −6.062901E+09 | |
| | HWL; 532 | | | |
| | PHASE COEFFICIENT | | | |
| | C2; 2.5092E−01 | C3; 1.3791E−02 | C5; 1.6206E−02 | |
| | C7; −1.5949E−04 | C9; −9.8961E−05 | C10; −3.4965E−05 | |
| | C12; −4.4563E−05 | C14; −5.1202E−05 | C16; −3.1989E−06 | |
| | C18; −7.6008E−06 | C20; −1.5604E−05 | C21; 9.2559E−07 | |
| | C23; 4.2576E−07 | C25; 1.0402E−06 | C27; 4.8471E−06 | |
| | C29; 2.9462E−08 | C31; 2.4387E−07 | C33; 1.2309E−07 | |
| | C35; 5.4190E−07 | C36; −1.8454E−08 | C38; 9.2278E−09 | |
| | C40; −3.7811E−08 | C42; −4.7794E−09 | C44; −1.8268E−07 | |
| | C46; 0.0000E+00 | C48; 0.0000E+00 | C50; 0.0000E+00 | |
| | C52; 0.0000E+00 | C54; 0.0000E+00 | C55; 0.0000E+00 | |
| | C57; 0.0000E+00 | C59; 0.0000E+00 | C61; 0.0000E+00 | |
| | C63; 0.0000E+00 | C65; 0.0000E+00 | | |
| S4 | THIRD REFLECTION SURFACE | INFINITY | REFLECTION SURFACE | |
| S5 | SECOND REFLECTION SURFACE | INFINITY | REFLECTION SURFACE | |
| S6 | FIRST REFLECTION SURFACE | INFINITY | REFLECTION SURFACE | |
| S7 | INCIDENT SURFACE (ASPHERICAL SURFACE) | −78.4753 | AIR | |
| | k; 0 | A; 2.16267E−04 | B; −9.96980E−06 | |
| | C; 1.94034E−07 | D; −1.30251E−09 | | |
| S8 | CG SURFACE | INFINITY | BK7 | |
| S9 | DISPLAY SURFACE | INFINITY | | |

| SURFACE NUMBER | x | y | z | ADE |
|---|---|---|---|---|
| S1 | 0 | 0 | 0 | 0 |
| S2 | 0 | −2.000 | 14.000 | 0.000 |
| S3 | 0 | −2.000 | 16.350 | −31.000 |
| S4 | 0 | 1.500 | 14.000 | 0 |
| S5 | 0 | 9.000 | 18.700 | 0 |
| S6 | 0 | 17.000 | 14.000 | 0 |
| S7 | 0 | 22.457 | 19.000 | 72.559 |

-continued

| | | | | |
|---|---|---|---|---|
| S8 | 0 | 29.324 | 23.765 | 46.130 |
| S9 | 0 | 29.901 | 24.319 | 46.130 |

FIELD ANGLE
X DIRECTION; −13.1° to 13.1°
Y DIRECTION; −15° to 0°

Example 4

| SURFACE NUMBER | | RADIUS OF CURVATURE | MEDIUM | |
|---|---|---|---|---|
| S1 | PUPIL PLANE | INFINITY | AIR | PUPIL DIAMETER 3 mm |
| S2 | OUTPUT SURFACE | INFINITY | PMMA | |
| S3 | HOE SURFACE (CYLINDRICAL SURFACE) RX; −250 | | REFLECTION SURFACE | |
| | | DEFINITION OF TWO LINES OF LIGHT FLUX | | |
| | HV1; REA | HV2; VIR | | |
| | HX1; 0.000000E+00 | HY1; −6.699121E+00 | HZ1; −2.166441E+01 | |
| | HX2; 0.000000E+00 | HY2; 2.485100E+08 | HZ2; −6.062901E+09 | |
| | HWL; 532 | | | |
| | | PHASE COEFFICIENT | | |
| | C2; 2.6015E−01 | C3; 8.0811E−03 | C5; 7.8334E−03 | |
| | C7; −1.5068E−04 | C9; −1.4261E−04 | C10; −2.5725E−05 | |
| | C12; −8.3195E−06 | C14; −2.5702E−05 | C16; −5.1626E−06 | |
| | C18; −8.7685E−06 | C20; −7.0146E−06 | C21; 2.1389E−07 | |
| | C23; −1.7952E−06 | C25; −5.0337E−07 | C27; 1.6897E−06 | |
| | C29; 2.4079E−07 | C31; 1.3155E−06 | C33; −1.9591E−07 | |
| | C35; 2.2917E−07 | C36; 1.1672E−08 | C38; −1.5240E−07 | |
| | C40; −1.8646E−08 | C42; 5.9445E−08 | C44; −7.3801E−08 | |
| | C46; 0.0000E+00 | C48; 0.0000E+00 | C50; 0.0000E+00 | |
| | C52; 0.0000E+00 | C54; 0.0000E+00 | C55; 0.0000E+00 | |
| | C57; 0.0000E+00 | C59; 0.0000E+00 | C61; 0.0000E+00 | |
| | C63; 0.0000E+00 | C65; 0.0000E+00 | | |
| S4 | THIRD REFLECTION SURFACE | INFINITY | REFLECTION SURFACE | |
| S5 | SECOND REFLECTION SURFACE | INFINITY | REFLECTION SURFACE | |
| S6 | FIRST REFLECTION SURFACE | INFINITY | REFLECTION SURFACE | |
| S7 | INCIDENT SURFACE (ASPHERICAL SURFACE) | −33.94659 | AIR | |
| | k; 0 | A; 5.88796E−05 | B; −2.43542E−06 | |
| | C; 8.43266E−08 | D; −7.72815E−10 | | |
| S8 | CG SURFACE | INFINITY | BK7 | |
| S9 | DISPLAY SURFACE | INFINITY | | |

| SURFACE NUMBER | x | y | z | ADE |
|---|---|---|---|---|
| S1 | 0 | 0 | 0 | 0 |
| S2 | 0 | −2.000 | 14.000 | 0.000 |
| S3 | 0 | −2.000 | 16.350 | −31.000 |
| S4 | 0 | 1.500 | 14.000 | 0 |
| S5 | 0 | 9.000 | 18.700 | 0 |
| S6 | 0 | 17.000 | 14.000 | 0 |
| S7 | 0 | 21.461 | 19.000 | 58.973 |
| S8 | 0 | 30.651 | 23.765 | 52.325 |
| S9 | 0 | 31.284 | 24.254 | 52.325 |

FIELD ANGLE
X DIRECTION; −13.1° to 13.1°
Y DIRECTION; −15° to 0°

Example 5

| SURFACE NUMBER | | RADIUS OF CURVATURE | MEDIUM | |
|---|---|---|---|---|
| S1 | PUPIL PLANE | INFINITY | AIR | PUPIL DIAMETER 3 mm |
| S2 | OUTPUT SURFACE (CYLINDRICAL SURFACE) RX; −180.3518 | | PMMA | |
| S3 | HOE SURFACE (CYLINDRICAL SURFACE) RX; −115.1732 | | REFLECTION SURFACE | |
| | DEFINITION OF TWO LINES OF LIGHT FLUX | | | |
| | HV1; REA | HV2; VIR | | |
| | HX1; 0.000000E+00 | HY1; −7.124361E+00 | HZ1; −2.041773E+01 | |
| | HX2; 0.000000E+00 | HY2; 2.485100E+08 | HZ2; −6.062901E+09 | |
| | HWL; 532 | | | |
| | PHASE COEFFICIENT | | | |
| | C2; 2.9414E−01 | C3; 6.1471E−03 | C5; 8.0036E−03 | |
| | C7; −1.7758E−04 | C9; −2.3691E−04 | C10; 7.3093E−06 | |
| | C12; −8.8008E−06 | C14; −4.2855E−06 | C16; −1.4570E−06 | |
| | C18; −4.6804E−06 | C20; 1.0477E−07 | C21; −2.1640E−06 | |
| | C23; −5.7157E−07 | C25; −1.1430E−06 | C27; −1.0766E−06 | |
| | C29; 6.3875E−09 | C31; 3.1327E−07 | C33; 1.1443E−07 | |
| | C35; −7.7770E−08 | C36; 7.3729E−08 | C38; −3.1648E−08 | |
| | C40; 6.0161E−08 | C42; 2.9851E−08 | C44; 3.7489E−08 | |
| | C46; 0.0000E+00 | C48; 0.0000E+00 | C50; 0.0000E+00 | |
| | C52; 0.0000E+00 | C54; 0.0000E+00 | C55; 0.0000E+00 | |
| | C57; 0.0000E+00 | C59; 0.0000E+00 | C61; 0.0000E+00 | |
| | C63; 0.0000E+00 | C65; 0.0000E+00 | | |
| S4 | THIRD REFLECTION SURFACE (CYLINDRICAL SURFACE) RX; −180.3518 | | REFLECTION SURFACE | |
| S5 | SECOND REFLECTION SURFACE (CYLINDRICAL SURFACE) RX; −180.3518 | | REFLECTION SURFACE | |
| S6 | FIRST REFLECTION SURFACE (CYLINDRICAL SURFACE) RX; −180.3518 | | REFLECTION SURFACE | |
| S7 | INCIDENT SURFACE (ASPHERICAL SURFACE) | −49.96939 | AIR | |
| | k; 0 | A; −2.84790E−05 | B; 1.59170E−06 | |
| | C; 2.44271E−08 | D; −6.24658E−10 | | |
| S8 | CG SURFACE | INFINITY | BK7 | |
| S9 | DISPLAY SURFACE | INFINITY | | |

| SURFACE NUMBER | x | y | z | ADE |
|---|---|---|---|---|
| S1 | 0 | 0 | 0 | 0 |
| S2 | 0 | −2.000 | 14.000 | 0.000 |
| S3 | 0 | −2.000 | 16.350 | −31.000 |
| S4 | 0 | 1.500 | 14.000 | 0 |
| S5 | 0 | 9.000 | 18.700 | 0 |
| S6 | 0 | 17.000 | 14.000 | 0 |
| S7 | 0 | 22.144 | 19.000 | 67.755 |
| S8 | 0 | 30.228 | 23.765 | 54.386 |
| S9 | 0 | 30.878 | 24.231 | 54.386 |

FIELD ANGLE
X DIRECTION; −13.1° to 13.1°
Y DIRECTION; −15° to 0°

Example 6

| SURFACE NUMBER | | RADIUS OF CURVATURE | MEDIUM | |
|---|---|---|---|---|
| S1 | PUPIL PLANE | INFINITY | AIR | PUPIL DIAMETER 3 mm |
| S2 | OUTPUT SURFACE | INFINITY | PMMA | |
| S3 | HOE SURFACE (CYLINDRICAL SURFACE) RX; −120 | | REFLECTION SURFACE | |
| | | DEFINITION OF TWO LINES OF LIGHT FLUX | | |
| | HV1; REA HX1; 0.000000E+00 HX2; 0.000000E+00 HWL; 532 | HV2; VIR HY1; −1.000000E+01 HY2; 1.000000E+05 | HZ1; −2.000000E+01 HZ2; 1.000000E+07 | |
| | | PHASE COEFFICIENT | | |
| | C2; 3.1811E−01 C7; −3.3369E−03 C12; −1.9324E−04 C18; −3.9148E−06 C23; 9.2264E−07 C29; 2.9856E−08 C35; −1.4538E−09 C40; 2.1328E−10 C46; 1.1740E−10 C52; −1.2523E−12 C57; 2.1960E−12 C63; −1.4087E−14 | C3; −3.3433E−03 C9; 4.5312E−03 C14; 9.3845E−05 C20; −4.6293E−07 C25; 1.2446E−08 C31; 1.8793E−08 C36; −1.0259E−10 C42; −1.6236E−11 C48; −1.9255E−11 C54; 1.0166E−14 C59; −4.6175E−13 C65; 2.6281E−16 | C5; 1.0001E−01 C10; 1.1062E−04 C16; 1.9016E−05 C21; 6.3647E−07 C27; −7.1215E−08 C33; 1.3940E−09 C38; 3.9337E−10 C44; −1.0251E−11 C50; 3.9689E−12 C55; 4.1204E−12 C61; 5.6801E−14 | |
| S4 | SECOND REFLECTION SURFACE | INFINITY | REFLECTION SURFACE | |
| S5 | FIRST REFLECTION SURFACE | INFINITY | REFLECTION SURFACE | |
| S6 | INCIDENT SURFACE (ASPHERICAL SURFACE) k; 0 C; −3.32367E−08 F; 0.00000E+00 | 292.05305 A; −1.55846E−04 D; 1.22114E−10 G; 0.00000E+00 | AIR B; 3.10103E−06 E; 0.00000E+00 | |
| S7 | CG SURFACE | INFINITY | BK7 | |
| S8 | DISPLAY SURFACE | INFINITY | | |

| SURFACE NUMBER | x | y | z | ADE |
|---|---|---|---|---|
| S1 | 0 | 0 | 0 | 0 |
| S2 | 0 | 0 | 21.5 | 0 |
| S3 | 0 | 18.0125 | 41.5525 | −29.7994 |
| S4 | 0 | 1.5 | 21.5 | 0 |
| S5 | 0 | 6.5 | 31 | 0 |
| S6 | 0 | 15.1485 | 25.1107 | −51.5372 |
| S7 | 0 | 22.4032 | 25.601 | −35.7442 |
| S8 | 0 | 22.8705 | 24.9517 | −35.7442 |

FIELD ANGLE
X DIRECTION; −20.7° to 20.7°
Y DIRECTION; −28.5° to 4.5°

In each of the examples 1 to 6, each value of H/y, f/(p+K·tan(2θi)), θt/θi, and |L/R| is represented in the following table 1. From the table 1, it is understood that the image display device 1 in each of the examples 1 to 6 meets all of the condition formulas (1) to (4).

TABLE 1

| condition formula | example 1 | example 2 | example 3 | example 4 | example 5 | example 6 |
|---|---|---|---|---|---|---|
| 0.8 < H/y < 1.7 | 1.00 | 1.11 | 1.10 | 1.11 | 1.11 | 1.44 |
| 1.2 < f/(p + K · tan(2θi)) < 5.5 | 2.96 | 2.95 | 2.96 | 2.96 | 2.96 | 1.98 |
| 1.1 < θt/θi < 7 | 2.51 | 2.52 | 2.55 | 2.55 | 2.54 | 2.23 |
| 0.02 < |L/R| < 0.5 | — | — | — | 0.07 | 0.16 | 0.26 |

Here, the present invention is especially effective in a case where the observation field angle in the screen short-side direction (that is, the Y direction) of the display element 11 is 15° or larger (full angle).

Here, it is also possible to express the present invention as follows; according to this, the following functions and effects are obtained.

Then image display device according to the present invention is an image display device that includes: a display element that displays an image; and an eyepiece optical system that guides image light from the display element to an observer's pupil via a prism; and in parallel with which, guides external light to the observer's pupil via the prism; the above eyepiece optical system includes, in the prism, three or more reflection surfaces for bending an optical path of the image light from the display element three or more times; a holographic diffraction optical element is formed on at least one surface of the reflection surfaces; and a structure is employed, in which the image display device according to the present invention meets the following condition formula (1).

$$0.8 < H/y < 1.7 \quad (1)$$

where H: a length of a straight line that connects both ends of an incident region, for the image light, in the reflection surface where the holographic diffraction optical element is formed in a plane that contains a screen-center principal ray;
  y: a length of the display element in a screen short-side direction.

Here, the screen-center principal ray refers to a ray that is output from the screen center of the display element and enters the center of the optical pupil formed by the eyepiece optical system. Besides, the plane that contains the screen-center principal ray refers to a plane that is defined by the three-time or more bending of the screen-center principal ray. Besides, hereinafter, the holographic optical element is called an HOE as well and a reflection surface where this HOE is formed is also called an HOE surface as well.

According to the above structure, the image light from the display element is guided to the observer's pupil via the prism (e.g., the eyepiece prism) of the eyepiece optical system. At the same time, the external light also is guided to the observer's pupil via the above prism. Accordingly, it becomes possible for the observer to overlap the virtual image of the image displayed by the display element on the external image and observe them at the same time.

Here, the eyepiece optical system has, in the above prism, the three or more reflection surfaces that bend the light path of the image light from the display element three times or more, so that it becomes possible to thin the thickness of the entire eyepiece optical system (especially, the prism) while securing a necessary light-path length. According to this, it is possible to compactly compose not only the image display device but also the HMD that have a small size.

Besides, the HOE is formed on at least one surface of the above reflection surfaces.

The prism has the HOE surface, so that it becomes possible to employ a structure that guides the image light from the display element to the observer's pupil via the HOE surface and guides the external light to the observer's pupil via the HOE surface. The HOE has wavelength selectivity that diffracts light in a predetermined wavelength range only and transmits light having a wavelength other than the wavelength of the diffracted light; this wavelength selectivity is especially high in a reflective-type HOE. Accordingly, even in a case where the field angle region (image observation region) for observing the display image and the field angle region (see-through region) for observing the external image in the see-through way are overlapped with each other, it becomes possible to allow the observer to observe the external image via the prism without losing almost all brightness of the external image.

Besides, if H/y becomes under the lower limit of the condition formula (1), the length in the screen short-side direction of the display element becomes relatively too long, so that if the thickness of the prism is not increased, it becomes impossible to input the image light, which is output from the upper edge (edge that passes through one end portion in the screen short-side direction) and from the lower edge (edge that passes through the other end portion in the screen short-side direction), into the prism. On the other hand, if H/y becomes over the upper limit of the condition formula (1), the thickness of the prism increases because of the enlargement of the incident region, for the image light, of the HOE surface.

As described above, even if H/y becomes under the lower limit or over the upper limit of the condition formula (1), the thickness of the prism increases, so that in a case where the eyepiece optical system has large optical power to widen the image observation region, the distance between the HOE surface and the display element becomes small. As a result of this, even if it is possible to secure a wide image observation region, it becomes impossible to secure a wide see-through region over the image observation region.

Accordingly, by meeting the condition formula (1), it is possible to curb the increase in the thickness of the prism and secure both of the wide image observation region and the wide see-through region. Especially, it is possible to secure the wide see-through region over the image observation region.

It is desirable that the image display device according to the present invention meets the following condition formula (2).

$$1.2 < f/(p+K\cdot\tan(2\theta i)) < 5.5 \quad (2)$$

where f: a focal length of the eyepiece optical system in the vicinity of the screen-center principal ray in the plane that contains the screen-center principal ray;
  p: a length of the optical pupil formed by the eyepiece optical system in a direction that corresponds to the screen short-side direction of the display element;
  K: a distance from the output surface, for the image light, of the prism to the optical pupil;
  θi: half of the observation field angle of the display image in the eyepiece optical system in the plane that contains the screen-center principal ray.

If f/(p+K·tan(2θi)) becomes under the lower limit of the condition formula (2), the focal length (distance between the HOE surface and the image surface (display surface of the display element)) of the eyepiece optical system becomes short, so that it becomes impossible to bend the light path of the image light in the prism three times or more; as a result of which, it becomes impossible to thin the prism. On the other hand, if f/(p+K·tan(2θi)) becomes over the upper limit of the condition formula (2), the focal length of the eyepiece optical system becomes long and the entire image display device becomes large.

Accordingly, by meeting the condition formula (2), it becomes possible to achieve the thickness reduction of the prism and the size reduction of the entire image display device at the same time.

In the image display device according to the present invention, it is desirable that the above eyepiece optical system, in the above prism, bends the light path of the image light from the display element in a plane that is parallel to the screen short side of the display element and perpendicular to the screen long side of the display element. In this case, it is possible to surely thin the thickness of the prism of the eyepiece optical system, so that it is possible to surely obtain the effect of securing both of the wide image observation region and the wide see-through region with a small-size and compact structure.

It is desirable that the image display device according to the present invention meets the following condition formula (3).

$$1.1 < \theta t/\theta i < 7 \quad (3)$$

where θt: half of the observation field angle of the external image by the external light that travels in the prism in the plane that contains the screen-center principal ray.

If θt/θi becomes under the lower limit of the condition formula (3), the field angle region of the external image becomes too small; and not only it is impossible to secure the see-through region over the image observation region, but also the display element is situated over the image observation region, which results in a structure in which the observer feels stressed. On the other hand, if θt/θi becomes over the upper limit of the condition formula (3), the field angle region of the external image becomes too large and the structure of the eyepiece optical system becomes large and heavy, so that for example, at a time of mounting the image display device on the observer's head, the burden on the observer increases during the use time.

Accordingly, by meeting the condition formula (3), it is possible to reduce the feeling of stress and the burden given to the observer during the use time.

A structure may be employed, in which when the above prism is defined as a first prism, the image display device according to the present invention includes a second prism that is disposed adjacent or adhered to the first prism and cancels refraction of the external light by the first prism. According to this structure, it is possible to prevent a distortion from occurring in the external image which the observer observes via the first prism.

In the image display device according to the present invention, the above reflection surface where the holographic diffraction optical element is formed may have optical power. For example, in a case where it is tried to make the eyepiece optical system have optical power, it is possible for the HOE and the above reflection surface (HOE surface) to share the optical power with each and reduce the burden of the optical power given to the HOE. According to this, it becomes possible to correct the chromatic aberration of magnification caused by the color dispersion at the HOE.

In the image display device according to the present invention, it is desirable that the above reflection surface where the holographic diffraction optical element is formed has a rotationally asymmetrical anamorphic shape. The observation field angle in the direction corresponding to the screen long-side direction of the display element is different from the observation field angle in the direction corresponding to the screen short-side direction of the display element, so that the chromatic aberrations of magnification caused by the color dispersion at the HOE are different from each other in the above both directions. However, by using a rotationally asymmetrical anamorphic shape as the reflection surface where the HOE is formed, it becomes possible to correct the chromatic aberration of magnification in a good-balanced way in the above both directions.

In the image display device according to the present invention, in the above reflection surface where the holographic diffraction optical element is formed, it is desirable that the focal length in the direction corresponding to the screen long-side direction of the display element is smaller than the focal length in the direction corresponding to the screen short-side direction of the display element.

In the HOE surface, in the direction corresponding to the screen long-side direction of the display element, toward both ends of the HOE surface, the difference between the incident angle of the ray entering the HOE surface and the output angle of the ray output from the HOE surface becomes large, so that the chromatic aberration of magnification occurs notably caused by the color dispersion at the HOE. However, by making the optical power of the HOE surface larger in the direction corresponding to the screen long-side direction of the display element than in the direction corresponding to the screen short-side direction of the display element, it is possible to reduce in the above direction the optical power that is given to the HOE, so that it becomes possible to curb the chromatic aberration of magnification that occurs notably at both ends in the above direction.

In the image display device according to the present invention, it is desirable that the above reflection surface where the holographic diffraction optical element is formed is a cylindrical surface. In this case, it is possible to easily attach a film-like hologram photosensitive material to the reflection surface of the prism. As a result of this, it becomes possible to easily fabricate the eyepiece optical system and easily obtain the HMD that has a wide field angle.

In the image display device according to the present invention, it is desirable that the above cylindrical surface has the optical power in the direction that corresponds to the screen long-side direction of the display element. In this case, it becomes possible to reduce the optical power given to the HOE in the above direction corresponding to the screen long-side direction of the display element and effectively curb the chromatic aberration of magnification that occurs notably at both ends in the above direction.

It is desirable that the image display device according to the present invention meets the following condition formula (4).

$$0.02 < |L/R| < 0.5 \qquad (4)$$

where L: a distance to a point farthest from the optical pupil in the incident region, for the image light from the display element, of the cylindrical surface in the plane that contains the screen-center principal ray.

R: a radius of curvature of the cylindrical surface.

If |L/R| becomes under the lower limit of the condition formula (4), the optical power of the cylindrical surface becomes small and the optical power that the HOE shares becomes large. As a result of this, the chromatic aberration of magnification at the eyepiece optical system notably occurs because of the color dispersion at the HOE. In contrast, if |L/R| becomes over the upper limit of the condition formula (4), the optical power of the cylindrical surface becomes large and a large distortion aberration occurs at the eyepiece optical system.

Accordingly, by meeting the condition formula (4), it is possible to correct the chromatic aberration of magnification and the distortion aberration in a good-balanced way.

A head-mounted display according to the present invention is so structured as to include: the above image display device according to the present invention; and a support means that supports the image display device in front of the observer. In this structure, the image display device is supported by the support means, so that the observer is able to observe the image provided by the image display device without using the hands.

INDUSTRIAL APPLICABILITY

The present invention is applicable to an HMD of a glasses type that allows observation of a display image and an external image at the same time.

REFERENCE SIGNS LIST

1 image display device
2 support means
11 display element
12 eyepiece optical system
21 eyepiece prism (first prism)
22 deflection prism (second prism)
23 HOE

The invention claimed is:

1. An image display device comprising:
a display element that displays an image; and
an eyepiece optical system that guides image light from the display element to an observer's pupil via a prism; and in parallel with which, guides external light to the observer's pupil via the prism;
wherein the eyepiece optical system includes, in the prism, three or more reflection surfaces for bending an optical path of the image light from the display element three or more times;
a holographic diffraction optical element is formed on at least one surface of the reflection surfaces;
the prism includes: a first reflection surface and a second reflection surface that face each other; and a third reflection surface on which the holographic diffraction optical element is formed;
the first reflection surface, the second reflection surface and the third reflection surface each reflect the image light at least one time;
the holographic diffraction optical element has optical power; and
the image display device meets the following condition formulas (1) and (2):

$$0.8 < H/y < 1.7 \quad (1)$$

$$1.2 < f/(p + K \cdot \tan(2\theta i)) < 5.5 \quad (2)$$

where H: a length of a straight line that connects both ends of an incident region, for the image light, of the reflection surface where the holographic diffraction optical element is formed in a plane that contains a screen-center principal ray;
y: a length of the display element in a screen short-side direction;
f: a focal length of the eyepiece optical system in the vicinity of the screen-center principal ray in the plane that contains the screen-center principal ray;
p: a length of an optical pupil formed by the eyepiece optical system in a direction that corresponds to the screen short-side direction;
K: a distance from an output surface, for the image light, of the prism to the optical pupil;
θi: half of an observation field angle of a display image in the eyepiece optical system in the plane that contains the screen-center principal ray.

2. The image display device according to claim 1, wherein in the prism, the eyepiece optical system bends the optical path of the image light from the display element in a plane that is parallel to a screen short side of the display element and perpendicular to a screen long side of the display element.

3. The image display device according to claim 1, further meeting the following condition formula (3):

$$1.1 < \theta t/\theta i < 7 \quad (3)$$

where θt: half of an observation field angle of an external image formed by the external light that travels in the prism in the plane that contains the screen-center principal ray.

4. The image display device according to claim 1, wherein when the prism is defined as a first prism, the image display device further comprises a second prism which is disposed adjacent or adhered to the first prism and cancels refraction of the external light at the first prism.

5. The image display device according to claim 1, wherein the third reflection surface has optical power.

6. The image display device according to claim 5, wherein the third reflection surface has a rotationally asymmetrical anamorphic shape.

7. The image display device according to claim 6, wherein a focal length of the third reflection surface in a direction corresponding to the screen long-side direction of the display element is smaller than a focal length of the third reflection surface in a direction corresponding to the screen short-side direction of the display element.

8. The image display device according to claim 6, wherein the third reflection surface is a cylindrical surface.

9. The image display device according to claim 8, wherein the cylindrical surface has the optical power in the direction corresponding to the screen long-side direction of the display device.

10. The image display device according to claim 8, further meeting the following condition formula (4):

$$0.02 < |L/R| < 0.5 \quad (4)$$

where L: a distance to a point farthest from the optical pupil in the incident region, for the image light from the display element, of the cylindrical surface in the plane that contains the screen-center principal ray;
R: a radius of curvature of the cylindrical surface.

11. A head-mounted display comprising:
the image display device according to claim 1; and
a support member that supports the image display device in front of an observer.

* * * * *